(12) United States Patent
Nakata et al.

(10) Patent No.: US 7,099,244 B2
(45) Date of Patent: Aug. 29, 2006

(54) WOBBLE DEMODULATOR AND WOBBLE DEMODULATION METHOD

(75) Inventors: Kohei Nakata, Osaka (JP); Toyoji Gushima, Habikino (JP); Makoto Usui, Osaka (JP); Kazuya Ohshima, Amagasaki (JP); Junichi Minamino, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 451 days.

(21) Appl. No.: 10/660,258

(22) Filed: Sep. 10, 2003

(65) Prior Publication Data

US 2004/0071228 A1 Apr. 15, 2004

(30) Foreign Application Priority Data

Oct. 10, 2002 (JP) ............................. 2002-297296
Apr. 10, 2003 (JP) ............................. 2003-106392

(51) Int. Cl.
*G11B 20/08* (2006.01)
*G11B 15/52* (2006.01)
*G11B 20/10* (2006.01)

(52) U.S. Cl. ................................ 369/47.19; 369/44.13; 369/47.22; 369/53.34; 369/53.22

(58) Field of Classification Search .............. 369/59.18
See application file for complete search history.

(56) References Cited

U.S. PATENT DOCUMENTS

| | | | |
|---|---|---|---|
| 5,999,504 A | 12/1999 | Aoki | |
| 6,345,018 B1 | 2/2002 | Maegawa et al. | |
| 2003/0112725 A1 | 6/2003 | Kobayashi et al. | |
| 2003/0165095 A1 | 9/2003 | Iimura et | |
| 2005/0088885 A1* | 4/2005 | Kobayashi | 365/200 |

FOREIGN PATENT DOCUMENTS

JP 10-69646 3/1998

(Continued)

*Primary Examiner*—Wayne Young
*Assistant Examiner*—Crystal Jones
(74) *Attorney, Agent, or Firm*—Hamre, Schumann, Mueller & Larson, P.C.

(57) ABSTRACT

A wobble demodulator for reproducing digital information from an optical recording medium in which a track is formed in accordance with a wobble signal that is MSK-modulated so as to contain the digital information by a carrier signal with a predetermined frequency and a sine wave signal with a frequency different from that of the carrier signal, includes: a wobble signal detector for detecting a wobble signal of the track from the optical recording medium; a wobble PLL for detecting the carrier signal based on the wobble signal detected by the wobble signal detector; a multiplier for multiplying the carrier signal detected by the wobble PLL by the wobble signal detected by the wobble signal detector and outputting a multiplied output; a MSK detector for detecting a MSK modulation mark having a phase or a frequency different from that of the carrier signal, based on an integrated value obtained by integrating the multiplied output from the multiplier on a predetermined section basis; and a MSK synchronization detector for detecting a synchronization position with respect to the digital information, based on the MSK modulation mark detected by the MSK detector, wherein the MSK detector compares a continuous predetermined number of the integrated values with a first threshold value for detecting a central portion of the MSK modulation mark, a second threshold value for detecting leading and trailing edges of the MSK modulation mark, and a third threshold value for detecting non-modulated portions before and after the MSK modulation mark, and detects the MSK modulation mark based on a pattern of a comparison result.

21 Claims, 22 Drawing Sheets

FOREIGN PATENT DOCUMENTS

| JP | 2001-126413 | 5/2001 |
| JP | 2001-143404 | 5/2001 |
| JP | 2002-342941 | 11/2002 |
| JP | 2002-352521 | 12/2002 |

* cited by examiner

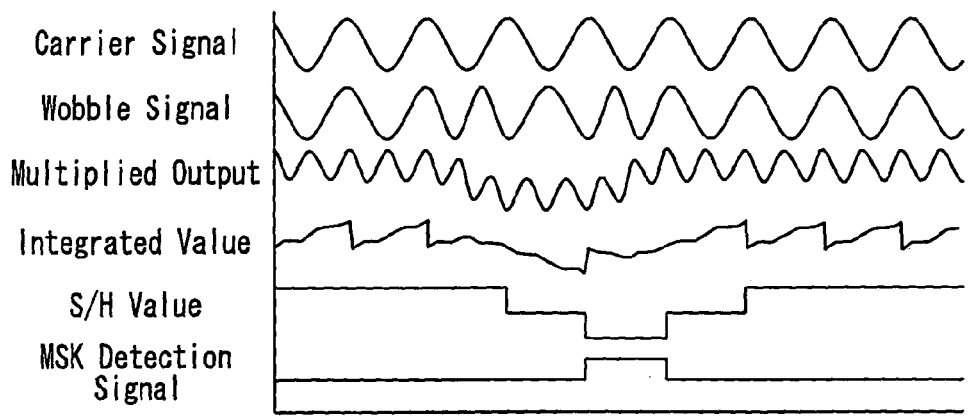
FIG. 23A
PRIOR ART
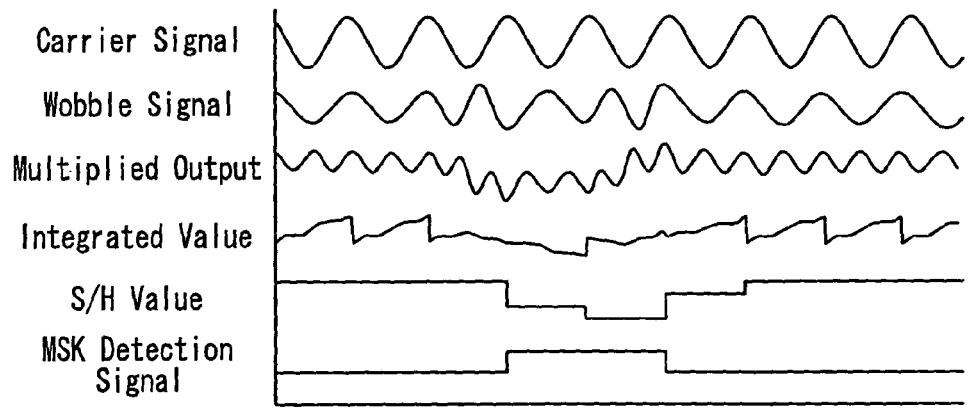
FIG. 23B
PRIOR ART
FIG. 24A
PRIOR ART
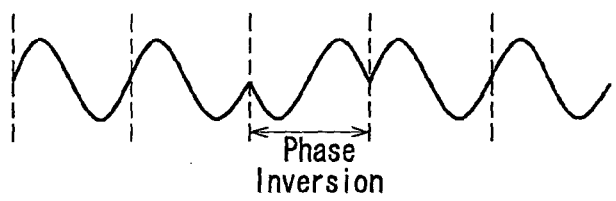
Phase Inversion
FIG. 24B
PRIOR ART
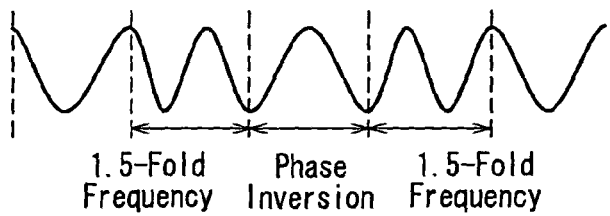
1.5-Fold Frequency    Phase Inversion    1.5-Fold Frequency

WOBBLE DEMODULATOR AND WOBBLE DEMODULATION METHOD

BACKGROUND OF THE INVENTION

1. Field of the Invention

The present invention relates to a wobble demodulator for detecting and demodulating a wobble signal from an optical recording medium, on which digital information such as address information is recorded by forming a MSK-modulated wobble in a track, thereby demodulating digital information, and a wobble demodulation method.

2. Description of the Related Art

Recently, the density of an optical recording medium is increasing. In general, a track groove is formed previously on a recordable optical recording medium, and information is recorded along the track groove, i.e., on the track groove or in a region (land) sandwiched by the track grooves. The track groove is formed so as to meander in a sine wave form, and information is recorded in synchronization with a dock generated based on a wobble period of the track groove. Furthermore, in order to record information at a predetermined position on a recording surface of an optical recording medium, an address is provided along the track groove. As a method for writing the address, Phase Shift Keying (PSK) (see JP 10(1998)-69646 A, for example) and Frequency Shift Keying (FSK) (see JP 2001-143404 A, for example) are known conventionally.

FIG. 20 is a block diagram showing a configuration of a conventional wobble demodulator 90 for demodulating digital information from a PSK-modulated or FSK-modulated wobble track as described above. In FIG. 20, reference numeral 401 denotes an optical recording medium on which a wobble track is modulated to be formed, and 402 denotes an optical head for irradiating the optical recording medium 401 with a light beam and detecting the amount of light reflected from the optical recording medium 401 to output an electric signal. Reference numeral 403 denotes a wobble signal detector for detecting a demodulated wobble signal from the electric signal. Reference numeral 404 denotes a carrier signal generator for generating a carrier signal based on the wobble signal. Reference numeral 405 denotes a multiplier for multiplying the wobble signal by the carrier signal, 406 denotes an integrator for integrating a multiplied output obtained by the multiplier 405 on the basis of a carrier period, and 407 denotes a decoder for decoding digital information based on the positive/negative sign of an integrated value obtained by the integrator 406 (see JP 2001-126413 A, for example).

In a section where the frequency or the phase is different between the wobble signal and the carrier signal due to the FSK modulation or the PSK modulation, a multiplied output from the multiplier 405 is negative. By allowing the multiplied output to pass through the integrator 406 on a carrier period basis so as to remove a noise component from the multiplied output from the multiplier 405, digital information can be obtained based on the sign of a value output from the integrator 406.

Furthermore, Minimum Shift Keying (MSK) has been proposed as one of the modulation systems of a wobble signal, in addition to the above-mentioned modulation systems. The MSK modulation is one of the types of the FSK modulation with continuous phases, in which a modulation index is 0.5. According to the FSK modulation, the signs of data to be modulated "0" and "1" are associated with two carrier signals having frequencies f1 and f2, whereby modulation is performed. That is, if the data to be modulated is "0", a sine waveform of the frequency f1 is obtained. If the data to be modulated is "1", a sine waveform of the frequency f2 is obtained. Furthermore, in the case of the FSK modulation with continuous phases, the phases of two carrier signals are continuous even at a change position of the signs of data to be modulated. According to the FSK modulation, a modulation index m is defined as follows: $m = |f1-f2|T$, where T is a transmission speed (time of 0.1/ shortest sign length) of data to be modulated. The FSK modulation with continuous phases in the case where the modulation index m is 0.5 is called MSK modulation.

FIG. 21 shows a MSK-modulated wobble signal waveform. One of two frequencies used for the MSK modulation is the same as that of a carrier signal, and the other is 1.5 times that of the carrier signal. More specifically, one of the signal waveforms used for the MSK modulation is $\cos(\omega t)$ or $-\cos(\omega t)$, and the other is $\cos(1.5\omega t)$ or $-\cos(1.5\omega t)$. As shown in FIG. 21, a wobble signal 211 has a waveform of $\cos(\omega t)$, $\cos(\omega t)$, $\cos(1.5\omega t)$, $-\cos(\omega t)$, $-\cos(1.5\omega t)$, $\cos(\omega t)$, $\cos(\omega t)$ on the basis of a carrier period. In this waveform, a 3-carrier period section having a signal waveform of $\cos(1.5\omega t)$, $-\cos(\omega t)$, and $-\cos(1.5\omega t)$ is referred to as a MSK modulation mark 212.

As shown in FIG. 22, address information is recorded by placing the MSK modulation mark 212 at a predetermined position, setting a 56-carrier period T22 to be one bit block. The MSK modulation mark 212 for taking bit synchronization is placed in the leading 0th to 2nd carrier periods. When the data bit of the address information is "1", the MSK modulation mark 212 is placed in the 12th to 14th carrier periods. When the data bit of the address information is "0", the MSK modulation mark 212 is placed in the 14th to 16th carrier periods.

In accordance with a technique extended from a conventional example, a wobble demodulator designed for the above-mentioned MSK modulation is configured, for example, as follows.

FIGS. 23A and 23B are timing diagrams of an operation of detecting a MSK modulation mark by a conventional wobble demodulation circuit. As shown in FIG. 23A, in a MSK modulation mark section, the frequency and the phase are different between a carrier signal and a wobble signal. Therefore, a multiplied output thereof is negative, and a S/H value obtained by integrating the multiplied output on the basis of a carrier period, in accordance with a sample-and-hold signal SH output on the basis of a carrier period, also has a negative value. The decoder 407 takes bit synchronization by measuring an output interval of a MSK detection signal output when the S/H value is negative, and decodes digital information.

FIGS. 24A and 24B show waveforms of wobble signals reproduced from wobble tracks modulated by the above-mentioned modulation systems. FIG. 24A shows a PSK-modulated wobble signal waveform, in which a phase is inverted in a PSK modulation portion. FIG. 24B is a MSK-modulated wobble signal waveform that is a kind of the FSK modulation. With respect to the wobble waveform $\cos(\omega t)$ in a non-modulated portion, a wobble waveform of $\cos(1.5\omega t)$, $-\cos(\omega t)$, $-\cos(1.5\omega t)$ is obtained on the basis of a carrier period in a 3-carrier period in the MSK-modulated portion.

A format has been proposed, in which address information is recorded in accordance with a position where a modulation mark by the above-mentioned PSK modulation or MSK modulation is placed.

FIGS. 25 and 26 show address formats using the MSK modulation. Address information is recorded on the basis of an address word, and the address word is composed of 83 units. The unit represents a synchronization pattern (SYNC) and a data bit in 56 carrier periods, and the address word is divided into a SYNC part of 8 units representing a synchronization position and a data part of 75 units representing an address value.

FIG. 25 shows a configuration of the SYNC part. The SYNC part is composed of 8 units: a monotone unit, a SYNC0 unit, a monotone unit, a SYNC1 unit, a monotone unit, a SYNC2 unit, a monotone unit, and a SYNC3 unit, arranged successively. At the leading position of each unit, a MSK modulation mark is placed, and in the SYNC0 unit, the SYNC1 unit, the SYNC2 unit, and the SYNC3 unit, MSK modulation marks are placed respectively at different positions.

FIG. 26 shows a configuration of the data part. The data part is composed of a monotone unit, a data1 unit, and a data0 unit. In the data1 unit and the data0 unit, MSK modulation marks are placed respectively at different positions. Furthermore, 5 units (1 monotone unit and 4 data1 units or 4 data0 units) represent an address value of 4 bits (1 Nibble). A data part (15 Nibbles) is composed of address data (9 Nibbles) and a parity (6 Nibbles). Because of this, an error can be corrected.

FIG. 27 is a block diagram showing a configuration of a conventional wobble demodulator 90A for reproducing address information from a wobble track based on an arrangement position of modulation marks by the above-mentioned PSK modulation or MSK modulation. In FIG. 27, reference numeral 1601 denotes an optical recording medium on which a wobble track is modulated to be formed, and 1602 denotes an optical head for irradiating the optical recording medium 1601 with a light beam and detecting the amount of light reflected from the optical recording medium 1061 to output an electric signal. Reference numeral 1603 denotes a wobble signal detector for detecting a modulated wobble signal from the electric signal. Reference numeral 1604 denotes a wobble PLL for extracting a carrier signal based on the wobble signal. Reference numeral 1605 denotes a decoder for reproducing address information based on the wobble signal and the carrier signal (See JP 2002-342941 A and JP 2002-352521 A, for example).

The decoder 1605 multiplies the wobble signal by the carrier signal by the multiplier 1606. Then, in a modulated portion detector 1607, the multiplication result is integrated, and based on the sign of its output value, a modulation mark is detected. Furthermore, a modulation mark may be detected based on the number of rising edges and falling edges of a wobble signal on the basis of a period of the carrier signal.

FIGS. 28A and 28B are timing diagrams in the case where a MSK modulation mark is detected by multiplication. As shown in FIG. 28A, in a MSK modulation mark portion, a multiplied output is negative, whereby the position of the MSK modulation mark can be detected.

A SYNC detector 1608 determines the SYNC0 unit/SYNC1 unit/SYNC2 unit/SYNC3 unit based on the modulation mark position to detect a synchronization position. A wobble counter 1609 has its value pre-set in accordance with the synchronization position detected by the SYNC detector 1608, and counts one address word on the basis of a carrier period. A data decoder 1610 determines the data1 unit and the data0 unit in the data part based on the modulation mark detection position with respect to the wobble counter 1609 and demodulates them, and further corrects errors to output address information.

However, in the case where address information and the like are inserted in a wobble signal in accordance with the MSK modulation described above with reference to FIGS. 20 to 23B, a wobble signal is deformed due to a cross talk component of an adjacent track as shown in FIG. 23B. Therefore, in a conventional wobble demodulator, the output position of the MSK detection signal is shifted to and fro, which may shift a bit synchronization position. As a result, an exact recording position cannot be obtained when user data is recorded, and the performance of reproducing an address may be degraded.

Furthermore, according to the conventional system described above with reference to FIGS. 24 to 28B, immediately after a track position for irradiating an optical recording medium with a light beam is changed due to seeking or jumping to an adjacent track, the frequency and the phase of a wobble signal are changed from the previous ones. Therefore, the frequency and the phase of the carrier signal generated by a wobble PLL are not matched with those of the wobble signal. For example, as shown in FIG. 28B, a MSK modulation mark portion is detected in a shifted state or erroneously detected, whereby the SYNC0 unit/SYNC1 unit/SYNC2 unit/SYNC3 unit are erroneously determined and synchronized to a shifted position. Consequently, an address cannot be reproduced. In order to reproduce an exact address in such a state, it is required that, after a carrier signal whose frequency and phase are matched with those of a wobble signal is to be obtained, a shift of a synchronization position is first detected, and thereafter, an exact synchronization position is detected. It takes a long period of time to reproduce address information, which may degrade the access performance to the optical recording medium.

Therefore, with the foregoing in mind, it is an object of the present invention to provide a wobble demodulator and a wobble demodulation method capable of reproducing address information stably and obtaining an exact recording position.

SUMMARY OF THE INVENTION

A wobble demodulator according to the present invention reproduces digital information from an optical recording medium in which a track is formed in accordance with a wobble signal that is MSK-modulated so as to contain the digital information by a carrier signal with a predetermined frequency and a sine wave signal with a frequency different from that of the carrier signal. The wobble demodulator includes: a wobble signal detector for detecting a wobble signal of the track from the optical recording medium; a carrier signal detector for detecting the carrier signal based on the wobble signal detected by the wobble signal detector; a multiplier for multiplying the carrier signal detected by the carrier signal detector by the wobble signal detected by the wobble signal detector and outputting a multiplied output; a MSK detector for detecting a MSK modulation mark having a phase or a frequency different from that of the carrier signal, based on an integrated value obtained by integrating the multiplied output from the multiplier on a predetermined section basis; and a MSK synchronization detector for detecting a synchronization position with respect to the digital information, based on the MSK modulation mark detected by the MSK detector, wherein the MSK detector compares a continuous predetermined number of absolute values of the integrated values with a first threshold value for detecting a central portion of the MSK modulation mark, a second threshold value for detecting leading and trailing edges of the MSK modulation mark, and a third threshold value for detecting non-modulated portions before and after the MSK modulation mark, and detects the MSK modulation mark based on a pattern of a comparison result.

Another wobble demodulator according to the present invention reproduces digital information from an optical recording medium in which a track, for recording data in accordance with a wobble signal modulated so as to represent digital information by a combination of a modulation signal that is frequency-modulated or phase-modulated and a carrier signal that is not frequency-modulated or phase-modulated, is wobbled to be formed. The wobble demodulator includes a wobble signal detector for detecting a wobble signal in accordance with wobbling of the track from the optical recording medium; a wobble PLL for detecting the carrier signal based on the wobble signal detected by the wobble signal detector; a PLL lock determiner for detecting a lock state of a PLL representing a synchronization state in a frequency and a phase between the wobble signal and the carrier signal; and a decoder for reproducing address information by decoding the wobble signal detected by the wobble signal detector and the carrier signal detected by the wobble PLL in accordance with a detection result of the PLL lock determiner, wherein the decoder is operated so as to detect and lock a synchronization position with respect to the digital information when the PLL lock determiner detects a PLL lock, and is operated so as to unlock the locked synchronization position when the PLL lock determiner detects a PLL unlock.

An optical disk apparatus according to the present invention includes: an optical head for irradiating an optical recording medium with a light beam and converting the light beam reflected from the optical recording medium to an electric signal; and the wobble demodulator of the present invention for reproducing digital information based on the electric signal converted by the optical head.

A wobble demodulation method according to the present invention for reproducing digital information from an optical recording medium in which a track is formed in accordance with a wobble signal that is MSK-modulated so as to contain the digital information by a carrier signal with a predetermined frequency and a sine wave signal with a frequency different from that of the carrier signal, includes: detecting a wobble signal of the track from the optical recording medium; detecting the carrier signal based on the wobble signal detected by the detection of the wobble signal; multiplying the carrier signal detected by the detection of the carrier signal by the wobble signal detected by the detection of the wobble signal and outputting a multiplied output; detecting a MSK modulation mark having a phase or a frequency different from that of the carrier signal, based on an integrated value obtained by integrating the multiplied output in the multiplication on a predetermined section basis; and detecting a synchronization position with respect to the digital information, based on the MSK modulation mark detected in the detection of the MSK, wherein in the detection of the MSK, a continuous predetermined number of absolute values of the integrated values are compared with a first threshold value for detecting a central portion of the MSK modulation mark, a second threshold value for detecting leading and trailing edges of the MSK modulation mark, and a third threshold value for detecting non-modulated portions before and after the MSK modulation mark, and detects the MSK modulation mark based on a pattern of a comparison result.

Another wobble demodulation method according to the present invention for reproducing digital information from an optical recording medium in which a track, for recording data in accordance with a wobble signal modulated so as to represent digital information by a combination of a modulation signal that is frequency-modulated or phase-modulated and a carrier signal that is not frequency-modulated or phase-modulated, is wobbled to be formed, includes: detecting a wobble signal in accordance with wobbling of the track from the optical recording medium; detecting the carrier signal based on the wobble signal detected in the detection of the wobble signal; detecting a lock state of a PLL representing a synchronization state in a frequency and a phase between the wobble signal and the carrier signal; and reproducing address information by decoding the wobble signal detected in the detection of the wobble signal and the carrier signal detected in the detection of the carrier signal in accordance with a detection result in the determination of the PLL lock, wherein the decoding is performed so as to detect and lock a synchronization position with respect to the digital information when a PLL lock is detected in the determination of the PLL lock, and is performed so as to unlock the locked synchronization position when a PLL unlock is detected in the determination of the PLL lock.

These and other advantages of the present invention will become apparent to those skilled in the art upon reading and understanding the following detailed description with reference to the accompanying figures.

BRIEF DESCRIPTION OF THE DRAWINGS

FIGS. 23A and 23B are timing diagrams showing an operation of detecting a MSK modulation mark by a conventional wobble demodulation circuit.

FIGS. 24A and 24B are waveform diagrams showing waveforms of wobble signals reproduced from wobble tracks modulated by the PSK and MSK modulations.

DESCRIPTION OF THE PREFERRED EMBODIMENTS

Figure 1:
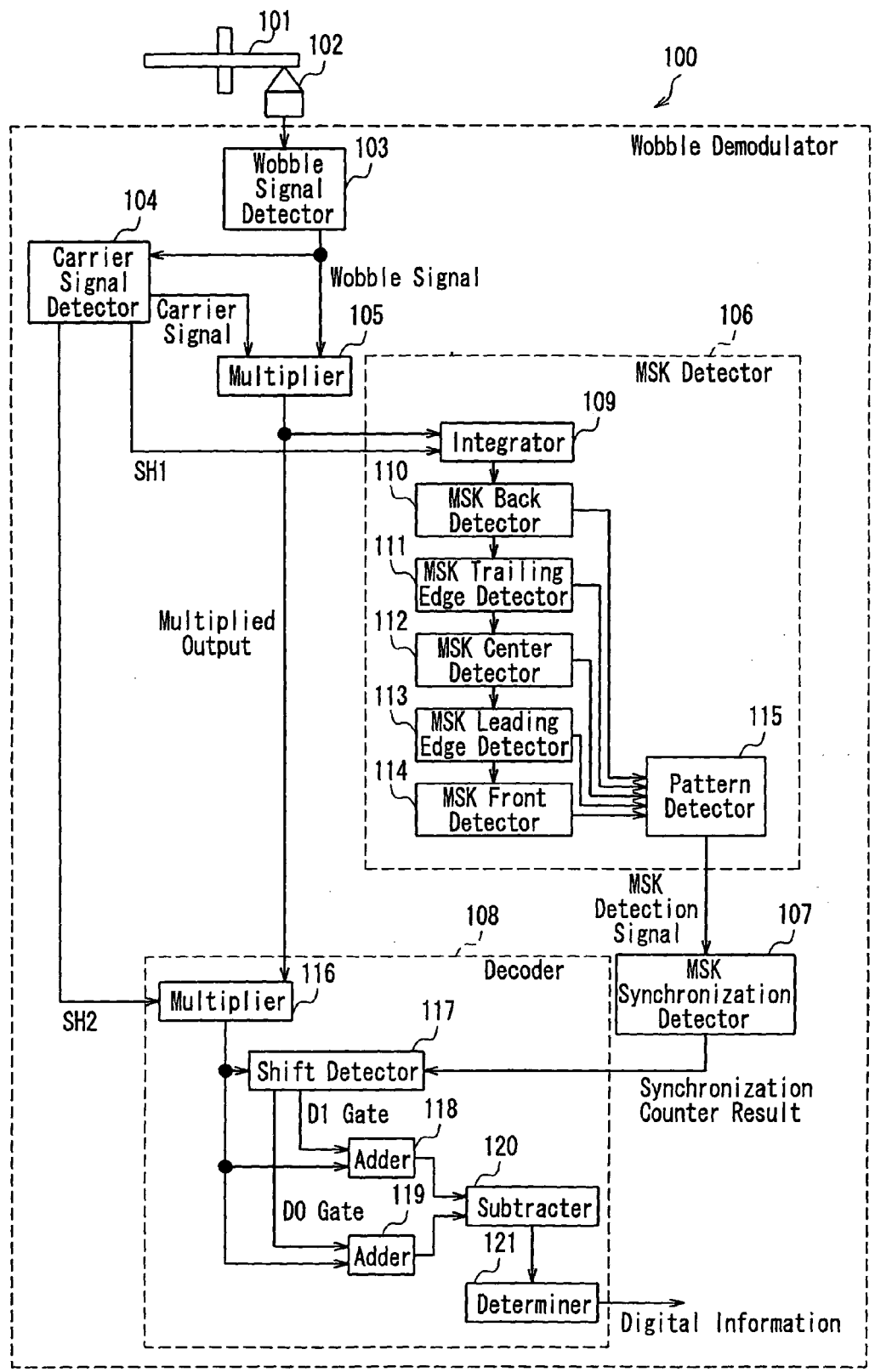
FIG. 1 is a block diagram showing a configuration of a wobble demodulator according to Embodiment 1 of the present invention.

A wobble demodulator according to the present embodiment compares a continuous predetermined number of integrated values with a first threshold value for detecting a central portion of a MSK modulation mark, a second threshold value for detecting leading and trailing edges of the MSK modulation mark, and a third threshold value for detecting non-modulated portions before and after the MSK modulation mark, and detects a MSK modulation mark based on a pattern of a comparison result. Therefore, even in the case where a wobble signal is deformed with a cross talk component, address information can be reproduced stably. Consequently, a wobble demodulator capable of obtaining an exact recording position of data can be provided.

In the above-mentioned embodiment, it is preferable that the continuous predetermined number of the integrated values are calculated by integrating only a negative value of the multiplied output from the multiplier on a half-period basis of the carrier signal.

It is preferable that the above-mentioned wobble demodulator further includes a decoder for decoding the digital information based on the synchronization position detected by the MSK synchronization detector and the multiplied output from the multiplier.

It is preferable that the first threshold value is higher than the second threshold value, and the second threshold value is higher than the third threshold value.

It is preferable that the above-mentioned wobble demodulator further includes a decoder for decoding the digital information based on the synchronization position detected by the MSK synchronization detector and the integrated value obtained by integrating the multiplied output from the multiplier on a predetermined section basis.

It is preferable that the decoder decodes the digital information based on a position at which the integrated value is minimum.

It is preferable that the MSK modulation mark is inserted in a predetermined position of the wobble signal.

It is preferable that the decoder decodes the digital information based on a sign of a difference value between a first sum obtained by summing integrated values in a MSK modulation mark section corresponding to data "1" of the digital information and a second sum obtained by summing integrated values in a MSK modulation mark section corresponding to data "0".

It is preferable that MSK modulation marks are disposed in the track at a predetermined interval as bit synchronization marks of the digital information, and the decoder detects a bias of an integrated value in a bit synchronization mark section, and shifts a section in which the first sum is obtained or a section in which the second sum is obtained in accordance with a detection result.

It is preferable that the decoder detects a bias of the integrated value based on a sign of the integrated value in the bit synchronization mark section and a comparison result between an integrated value in a central portion of the bit synchronization mark and an integrated value in leading and trailing edges of the bit synchronization mark.

In another wobble demodulator according to the present embodiment, a decoder is operated so as to detect and lock a synchronization position with respect to digital information when a PLL lock determiner detects a PLL lock, and is operated so as to unlock the locked synchronization position when the PLL lock determiner detects a PLL unlock. Therefore, even in the case where the frequency or phase of a wobble signal is changed due to seeking or jumping to an adjacent track, address information can be reproduced stably in a short period of time.

In the present embodiment, the wobble PLL includes a voltage control transmitter for generating a wobble clock obtained by multiplying a frequency of the carrier signal, the PLL lock determiner includes a period measurement unit for measuring a period of the wobble signal detected by the wobble signal detector based on the wobble clock generated by the voltage control transmitter, and the PLL lock determiner detects a frequency lock when a sum or an average value of the period of the wobble signal measured by the period measurement unit in a predetermined section is in a first range, and detects a frequency unlock when the sum or the average value is out of a predetermined second range.

It is preferable that the PLL lock determiner includes an exclusive OR integrator for integrating a result of an exclusive OR between a wobble binarized signal obtained by binarizing the wobble signal and a carrier binarized signal obtained by binarizing the carrier signal in a predetermined section, and the PLL lock determiner detects a phase lock when an integrated value obtained by the exclusive OR integrator is smaller than a predetermined first threshold value, and detects a phase unlock when the integrated value is larger than a predetermined second threshold value.

It is preferable that the wobble PLL includes a wobble period averaging unit for generating an averaged wobble signal obtained by averaging a period of the wobble signal detected by the wobble signal detector, and the wobble PLL generates the carrier signal based on the averaged wobble signal generated by the wobble period averaging unit in a state where the PLL lock determiner has not detected a frequency lock, and generates the carrier signal based on the wobble signal detected by the wobble signal detector in a state where the PLL lock determiner has detected a frequency lock.

It is preferable that in the optical recording medium, the digital information is composed on a predetermined information block basis having a synchronization signal containing a plurality of sink patterns, and when a predetermined number or more of the sink patterns are detected from the synchronization signal in one information block, the decoder is operated so as to lock a synchronization position based on detection positions of the sink patterns.

It is preferable that in the optical recording medium, the digital information is configured on a predetermined information block basis having a synchronization signal containing a plurality of sink patterns, and when information blocks in which a predetermined number or more of the sink patterns are not detected from the synchronization signal are continued a predetermined number of times, the decoder is operated so as to unlock a synchronization position.

It is preferable that in the optical recording medium, the digital information is configured on a predetermined information block basis having a synchronization signal containing a predetermined sink pattern, and when information blocks in which a position of a sink pattern detected from the synchronization signal is shifted from a synchronization position previously detected are continued a predetermined number of times, the decoder corrects the synchronization position by a shifted amount.

It is preferable that in the optical recording medium, the digital information is configured on a predetermined information block basis having a synchronization signal containing a predetermined sink pattern, data, and an error correction code of the data, the decoder includes an error corrector for correcting an error of the data based on the error correction code, and the decoder is operated so as to unlock a synchronization position when data reproduced in an information block in which a synchronization position is detected first is not error-correctable.

It is preferable that in the optical recording medium, the digital information is configured on a predetermined information block basis having a synchronization signal containing a predetermined sink pattern, data, and an error correction code of the data, the decoder includes an error-corrector for correcting an error of the data based on the error correction code, and the decoder is operated so as to unlock a synchronization position when an information block in which reproduced data is not error-correctable is continued a plurality of times.

Hereinafter, the present invention will be described by way of illustrative embodiments with reference to the drawings.

Embodiment 1

FIG. 1 is a block diagram showing a configuration of a wobble demodulator 100 according to Embodiment 1 of the present invention. In FIG. 1, reference numeral 101 denotes an optical recording medium in which a wobble track is MSK-modulated, and 102 denotes an optical head for irradiating the optical recording medium 101 with a light beam and detecting the amount of light reflected from the optical recording medium 101 to output an electric signal. Reference numeral 103 denotes a wobble signal detector for detecting a MSK-modulated wobble signal from the electric signal. Reference numeral 104 denotes a carrier signal generator for generating a carrier signal Cos ($\omega$t) synchronized in phase with the wobble signal. Reference numeral 105 denotes a multiplier for multiplying the wobble signal by the carrier signal, and 106 denotes a MSK detector for detecting a MSK modulation mark based on a multiplied output from the multiplier 105. Reference numeral 107 denotes a MSK synchronization detector for detecting a bit synchronization position from a MSK detection signal. The MSK synchronization detector 105 detects the position of a bit synchronization MSK modulation mark placed on the basis of 56 carrier periods to determine a synchronization position, and counts 56 carrier periods, setting the leading edge of a bit block to be 0. Reference numeral 108 denotes a decoder for decoding digital information based on a multiplied output in accordance with the synchronization counter result by the MSK synchronization detector 107.

Next, the detailed operation of the MSK detector 106 will be described.

The MSK detector 106 includes an integrator 109 for integrating a multiplied output from the multiplier 105 in accordance with a sample-and-hold signal SH1 output from the carrier signal generator 104, a MSK back detector 110 for holding an integrated value from the integrator 109 in a past predetermined section, a MSK trailing edge detector 111, a MSK center detector 112, a MSK leading edge detector 113, a MSK front detector 114, and a pattern detector 115 for determining a MSK modulation mark based on the pattern of an output result from the respective detectors 110, 111, 112, 113, and 114.

Figure 2A:
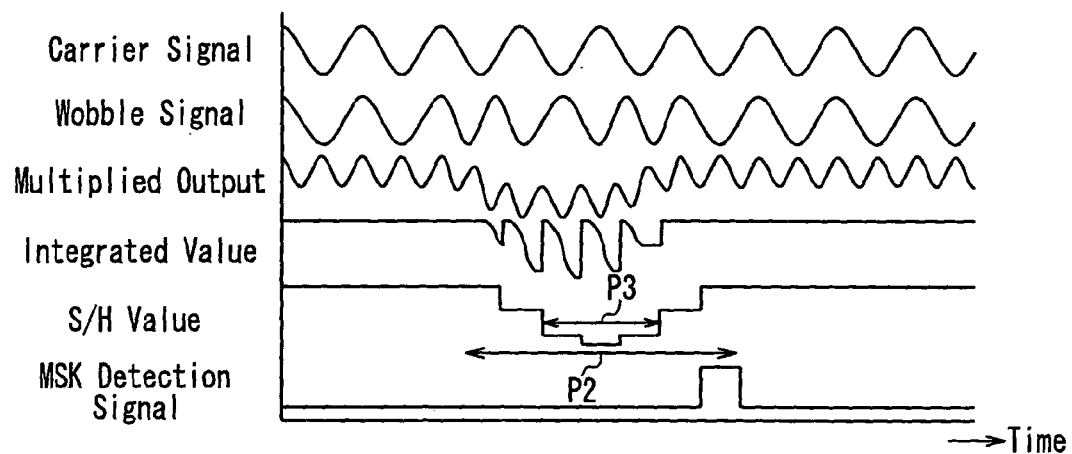
FIGS. 2A and 2B are timing waveform diagrams showing an operation of a MSK detector provided in the wobble demodulator according to Embodiment 1 of the present invention.
Figure 2B:
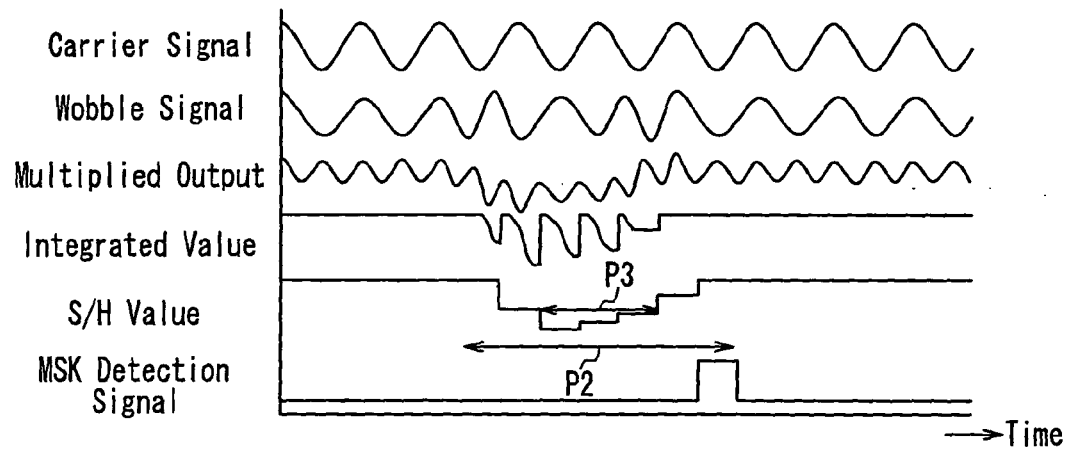

FIGS. 2A and 2B are timing waveform diagrams showing an operation of the MSK detector 106. The integrator 109 integrates a multiplied output from the multiplier 105 in accordance with the sample-and-hold signal SH1 output from the carrier signal generator 104. In order to detect a MSK modulation mark with high precision, the length of a section to be integrated is set to be short (i.e., a half carrier period), and multiplication is performed only when a multiplied output from the multiplier 105 is negative. The sample-and-hold signal SH1 showing an integration section is a pulse signal that is output when its phase is 90° and 270° with respect to a carrier signal Cos ($\omega$t). In the case where the sample-and-hold signal SH1 is not output, the integrator 109 integrates a multiplied output only when the multiplied output is negative. In the case where the sample-and-hole signal SH1 is output, the integrator 109 outputs an integrated value at that time as a S/H value and starts integration from 0.

Because of this, as shown in FIG. 2A, a S/H value is outstanding in a period P2 in which an integrated value is continued for 5 sections in a MSK modulation mark. The absolute value of the S/H value is large particularly in a period P3 extending central three sections. In periods before and after the period P3, the absolute value of the S/H value is smaller than that in the period P3. Sections showing this feature are detected as a MSK modulation mark by the pattern detector 115, and a MSK detection signal is output to the MSK synchronization detector 107.

Figure 3:
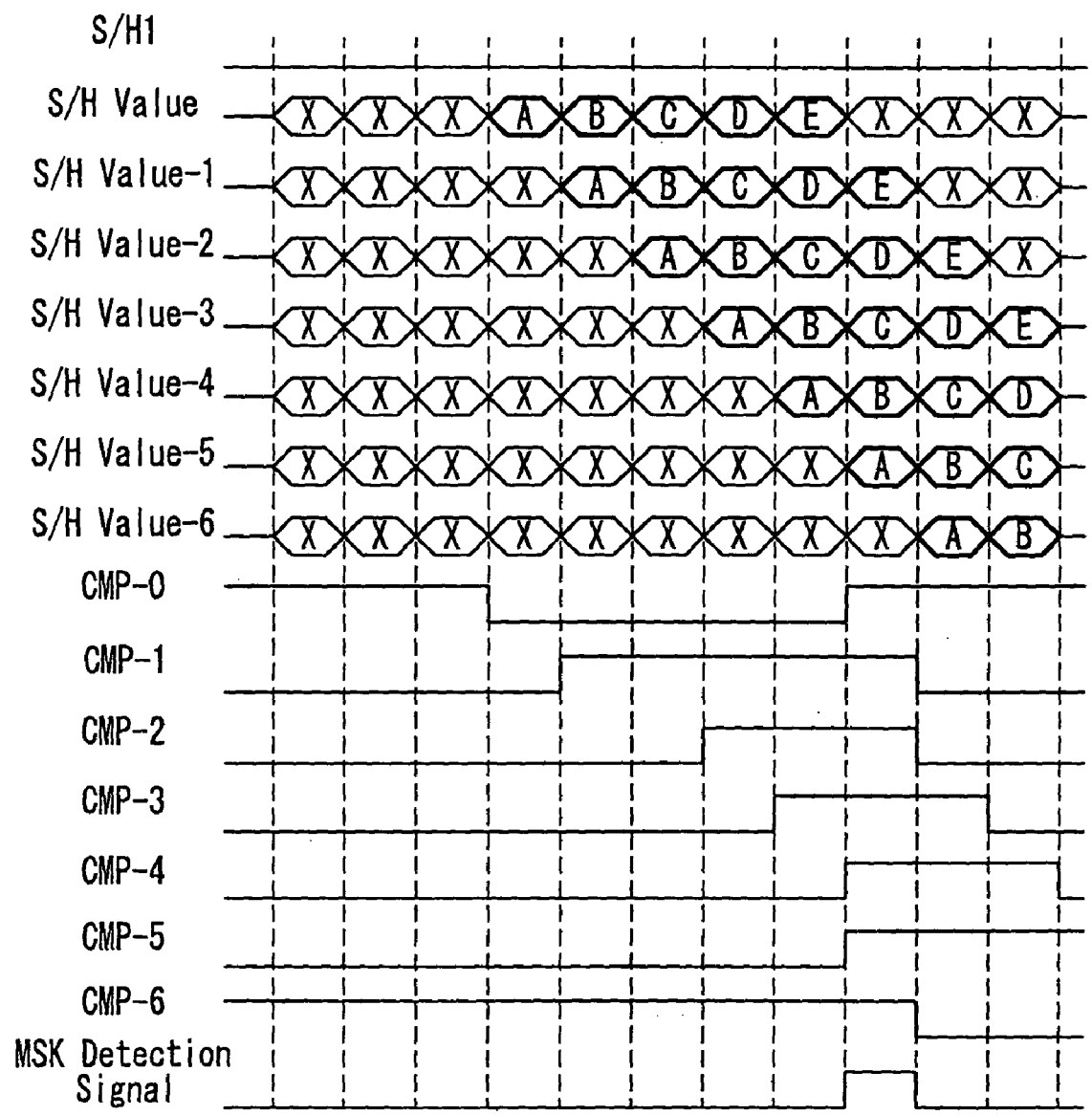
FIG. 3 is a timing waveform diagram showing an operation of the MSK detector provided in the wobble demodulator according to Embodiment 1 of the present invention.

FIG. 3 is a timing waveform diagram showing operations of the MSK back detector 110, the MSK trailing edge detector 111, the MSK center detector 112, the MSK leading edge detector 113, the MSK front detector 114, and the pattern detector 115 provided in the MSK detector 106 shown in FIG. 1. The MSK back detector 110 holds a S/H value output from the integrator 109. The MSK trailing edge detector 111 holds (S/H value −1) in one selection before the section to which the S/H value held by the MSK back detector 110 belongs. The MSK center detector 112 holds (S/H value −2), (S/H value −3), and (S/H value −4) in one to three sections before the section to which the (S/H value −1) held by the MSK trailing edge detector 111 belongs. The MSK leading edge detector 113 holds (S/H value −5) in one section before the section to which the (S/H value −4) held by the MSK center detector 112 belongs. The MSK front detector 114 holds (S/H value −6) in one section before the section to which the (S/H value −5) held by the MSK leading edge detector 113 belongs. The S/H values held by the respective detectors 110, 111, 112, 113, and 114 are shifted at each output timing of a SH1 signal.

The MSK back detector 110, the MSK trailing edge detector 111, the MSK center detector 112, the MSK leading edge detector 113, and the MSK front detector 114 compare the S/H value held by them with the predetermined threshold value. The MSK back detector 110 and the MSK front detector 114 determine that there is no MSK modulation mark in a section to which the S/H value belongs to when the absolute value thereof is smaller than a threshold value A, and output a MSK post-detection signal CMP0 and a MSK pre-detection signal CMP-6 to the pattern detector 115, respectively.

The MSK trailing edge detector 111 and the MSK leading edge detector 113 detect leading and trailing edges of a MSK modulation mark when the absolute value of the S/H value is larger than a threshold value B, and outputs a MSK trailing edge detection signal CMP-1 and a MSK leading edge detection signal CMP-5 to the pattern detector 115, respectively. The MSK center detector 112 detects a central portion of a MSK modulation mark when the absolute values of three S/H values held by the MSK center detector 112 are larger than a threshold value C, and outputs MSK center detection signals CMP-2, CMP-3, and CMP-4 to the pattern detector 115 in accordance with each S/H value. Herein, the thresholds values A, B, and C have a relationship: $0 \leq$ threshold value $A \leq$ threshold value $B \leq$ threshold value C.

Specific values of the threshold values A, B, and C are determined, for example, as follows:

Assuming that Wcos ($\omega$t) represents a waveform of a portion other than a MSK-modulated portion in a reproduced wobble signal, Rcos ($\omega$t) is a carrier signal waveform, an amplitude W of the wobble signal is changed in a range of Wmin to Wmax by leakage (cross talk) from an adjacent track, and D represents a value obtained by integrating (cos ($\omega$t)×cos ($\omega$t)) with a period of $\pi/2$ to $3\pi/2$, Threshold value C=Wmin×R×D×0.88, Threshold value B=Threshold value C×0.46, Threshold value A$\leq$Threshold value B, where the above-mentioned constants 0.88 and 0.46 are obtained by the MSK modulation.

The pattern detector 115 detects a MSK modulation mark when all of the detection signals CMP0, CMP-1, CMP-2, CMP-3, CMP-4, CMP-5, and CMP-6 are output, and outputs a MSK detection signal.

As described above, a MSK modulation mark can be detected by the MSK detector 106, as shown in FIG. 2A. Furthermore, as shown in FIG. 2B, even in the case where a wobble signal is deformed with a cross talk component and the like, by appropriately setting the threshold values A, B, and C, a MSK modulation mark can be detected at an exact position.

Next, the detailed operation of the decoder 108 will be described.

The decoder 108 includes an integrator 116 for integrating a multiplied output from the multiplier 105, a shift detector 117 for detecting a deformation of a wobble signal caused by a cross talk component, an adder 118 for calculating a sum of output values from the integrator 116 in a MSK modulation mark section when data is "1", an adder 119 for calculating a sum of output values from the integrator 116 in a MSK modulation mark section when data is "0", a subtracter 120 for calculating the difference between an output value from the adder 118 and an output value from the adder 119, and a data determiner 121 for decoding data based on the sign of an output value from the subtracter 120.

Figure 4A:
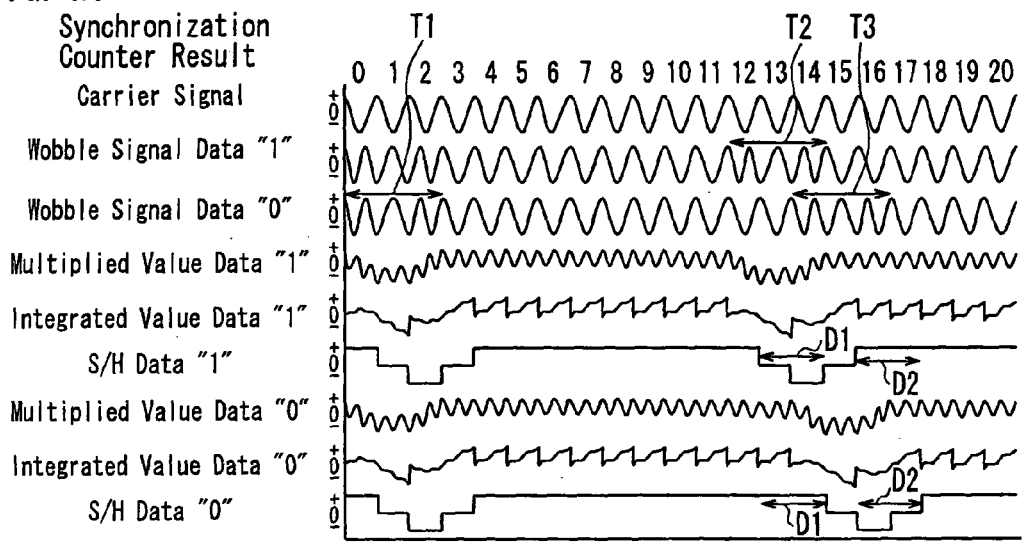
FIGS. 4A, 4B, and 4C are timing waveform diagrams showing an operation of a decoder provided in the wobble demodulator according to Embodiment 1 of the present invention.
Figure 4B:
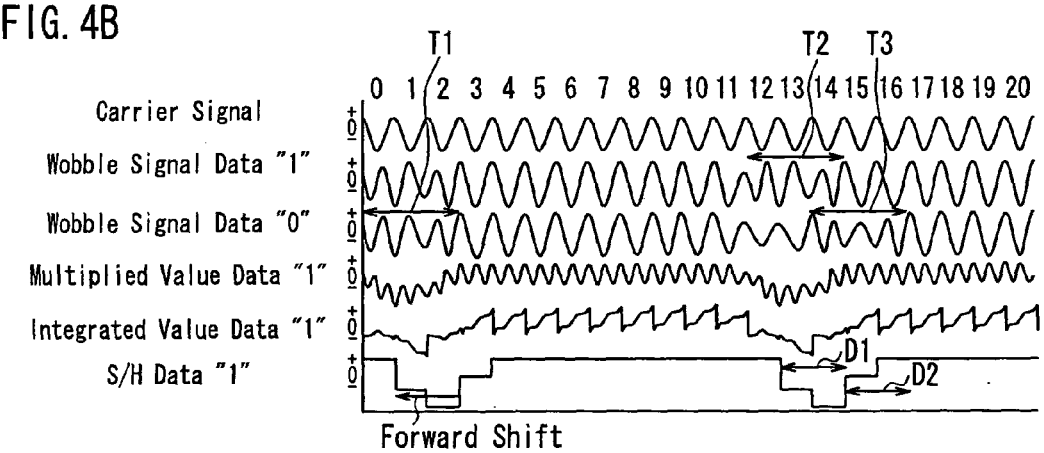
Figure 4C:
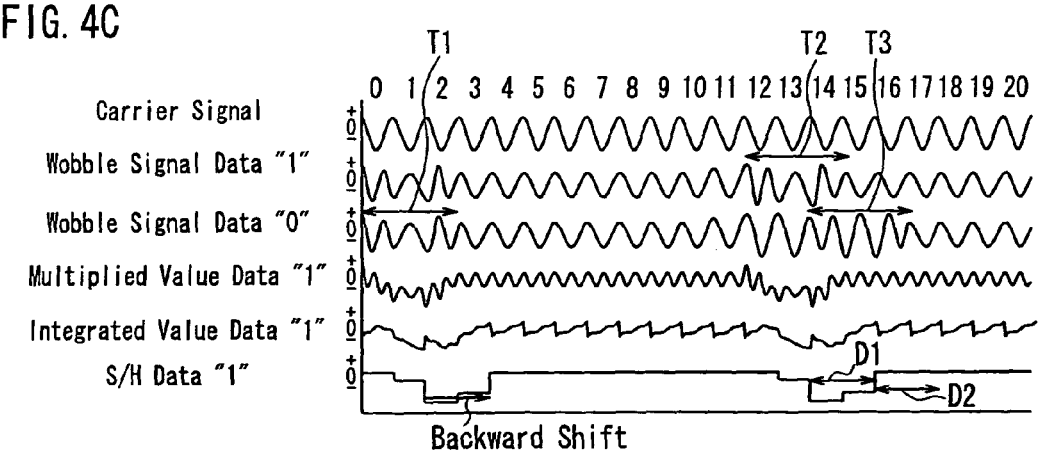

FIGS. 4A, 4B, and 4C are timing waveform diagrams showing an operation of the decoder 108. The integrator 116 provided in the decoder 108 integrates a multiplied output from the multiplier 105 in accordance with a sample-and-hold signal SH2 output from the carrier signal generator 104. The sample-and-hold signal SH2 representing an integration section is a pulse signal that is output when its phase is 0° with respect to a carrier signal Cos ($\omega$t). When the sample-and-hold signal SH2 is not output, the integrator 116 integrates a multiplied output from the multiplier 105. When the sample-and-hold signal SH2 is output, the integrator 116 outputs an integrated value at that time as a S/H value and starts integration from 0.

As shown in FIG. 4A, in the absence of a deformation of a wobble signal, in the case where data is "1", the S/H value is 0 or less in three sections in which the value of the synchronization counter is 1 to 3 and in three sections in which the value of the synchronization counter is 13 to 15. In the case where data is "0", the S/H value is 0 or less in three sections in which the value of the synchronization counter is 1 to 3 and in three sections in which the value of the synchronization counter is 15 to 17. Furthermore, irrespective of whether data is "1" or "0", the S/H value is 0 or more in a section other than a period T2 or a period T3 corresponding to a MSK modulation mark. A period T1 represents a period corresponding to a bit synchronization mark. From the above, when a value obtained by subtracting the sum of S/H values in a section D0 in which the value of the synchronization counter is 16 to 17 from the sum of S/H values in a section D1 in which the value of the synchronization counter is 13 to 14 is negative, decoding is performed as data "1", and when this value is positive, decoding is performed as data "0".

However, as described above, when a wobble signal is deformed with a cross talk component, a section in which a S/H value is negative may be shifted to and fro as shown in FIGS. 4B and 4C. In particular, when the amplitude of a wobble signal is small, an erroneous decoding result may be obtained. In order to solve such a problem, a shift state of a section in which a S/H value is negative due to the deformation of a wobble signal is detected, and the sections D1 and D2 whose S/H values are to be added are shifted. In this manner, the section in which a S/H value is negative can be used effectively, and the reproduction performance of data can be enhanced.

The shift detector 117 provided in the decoder 108 detects and controls a shift as described above. Generally, the period of a cross talk component corresponds to several rotation numbers of the optical recording medium 101, and is sufficiently long with respect to the interval at which MSK modulation marks are placed. Therefore, in the same bit block, a bit synchronization MSK modulation mark and a MSK modulation mark representing data tend to be shifted in the same direction in a section in which a S/H value is negative. Based on this, the shift detector 117 detects a shift state in a section of a bit synchronization MSK modulation mark in which the value of the synchronization counter is 1 to 3.

A shift state is detected based on the comparison result between the signs of S/H values in three sections of a bit synchronization MSK modulation mark and the absolute values of the respective S/H values. A forward shift is determined when S/H values P, Q, and R in three sections satisfy P<0, Q<0, and R≧0, and |P|>|Q|/N (N is a constant larger than 1). A backward shift is determined when P≧0, Q<0, and R<0 and |R|>|Q|/N. Furthermore, when P<0, Q<0, R<0, and |P|>|Q|/N and |R|<|Q|/N, a forward shift is determined. When |P|<|Q|/N and |R|>|Q|/N, a backward shift is determined. In the other cases, the absence of shift is determined.

In the case where a track groove is scanned continuously in the above-mentioned detection of a shift state, the detection result is supposed to be changed only with a low frequency of about one period at several rotation numbers of the optical recording medium 101. Therefore, a shift state may be determined based on a plurality of detection results by further determining the continuity of a detection result, adding a plurality of detection results, and allowing a detection result to pass through a low-pass filter.

Figure 5:
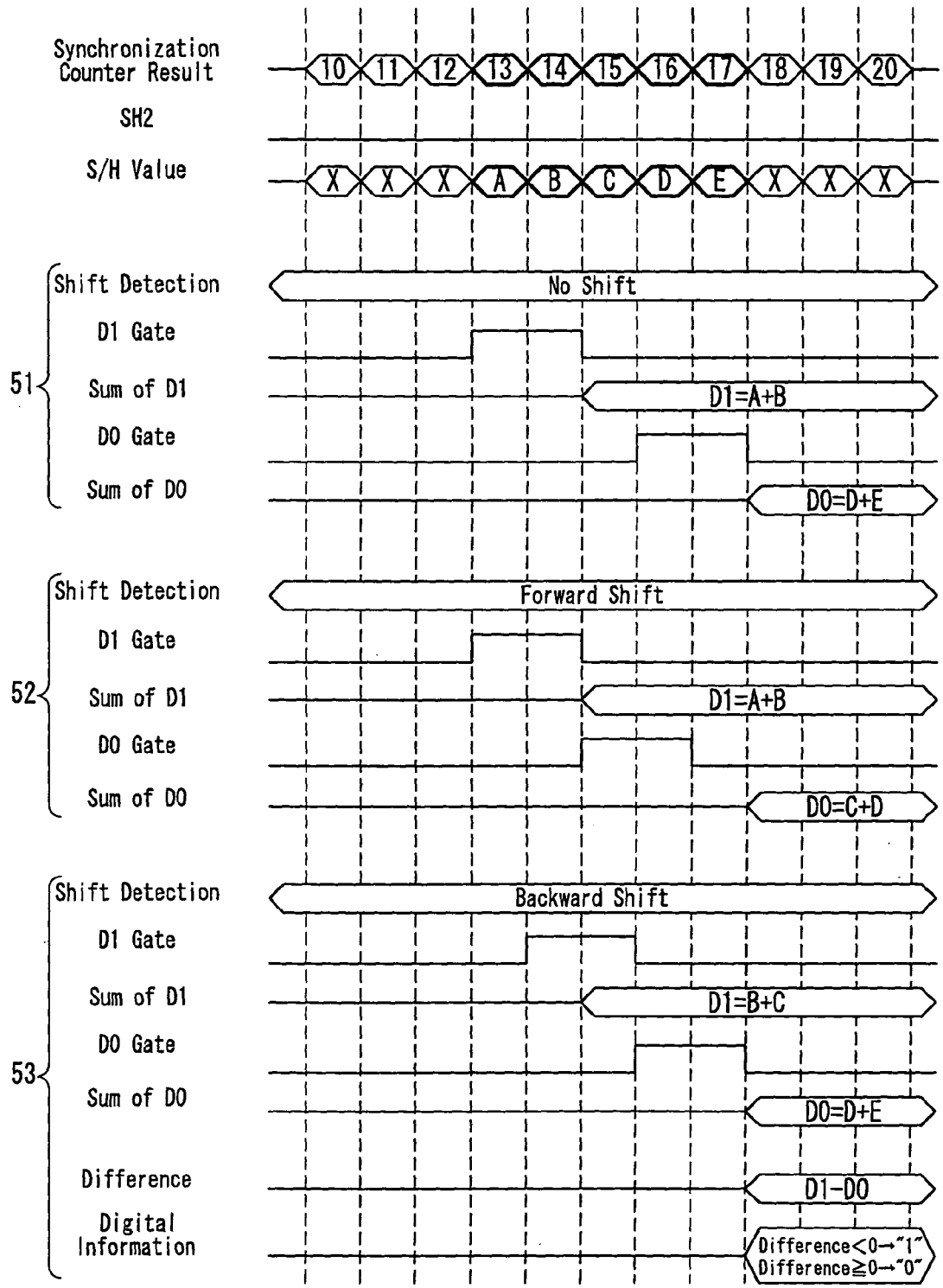
FIG. 5 is a timing waveform diagram showing a shift control and a decoding operation in accordance with the detection of a shift state.

FIG. 5 is a timing waveform diagram showing a shift control and a decoding operation in the sections D1 and D0 in accordance with the detection of a shift state.

As shown in a waveform group 51, when the shift detector 117 determines that there is no shift, the output position of a D1 gate representing the section D1 and the output position of a D0 gate representing the section D0 are a section of synchronization counter values 13 to 14 and a section of synchronization counter values 16 to 17, respectively. The sum of S/H values (sum of D1) in a section in which the D1 gate is output is obtained as D1=A+B, and the sum of S/H values (sum of D0) in a section in which the D0 gate is output is obtained as D0=D+E.

A waveform group 52 represents an operation when the shift detector 117 determines a forward shift. When the shift detector 117 determines a forward shift, the D0 gate is shifted forward by one section. Thus, the sum of D1 is obtained as D1=A+B, and the sum of D0 is obtained as D0=C+D.

In contrast, as shown in a waveform group 53, when the shift detector 117 determines a backward shift, the D1 gate is shifted backward by one section. Thus, the sum of D1 is obtained as D1=B+C, and the sum of D0 is obtained as D0=D+E.

With respect to the values of D1 and D0 obtained in accordance with the determination of a shift by the shift detector 117, subtraction (D1−D0) is performed in the subtracter 120. When the value of the subtraction result is negative, decoding is performed as data "1". When the value of the subtraction result is positive, decoding is performed as data "0". Thus, digital information can be obtained.

As described above, according to Embodiment 1, the wobble demodulator 100 reproduces digital information from the optical recording medium 101 in which a track is formed in accordance with a wobble signal that is MSK-modulated so as to contain digital information by a carrier signal with a predetermined frequency and a sine wave signal with a frequency different from the predetermined frequency. The wobble demodulator 100 includes the wobble signal detector 103 for detecting a wobble signal of a track from the optical recording medium 101, the carrier signal detector 104 for detecting a carrier signal based on the wobble signal detected by the wobble signal detector 103, a multiplier 105 for multiplying the carrier signal detected by the carrier signal detector 104 by the wobble signal detected by the wobble signal detector 103 and outputting a multiplied output, the MSK detector 106 for detecting a MSK modulation mark having a phase or a frequency different from that of the carrier signal based on an integrated value obtained by integrating the multiplied output from the multiplier 105 on a predetermined section basis, and the MSK synchronization detector 107 for detecting a synchronization position with respect to digital information based on the MSK modulation mark detected by the MSK detector 106. The MSK detector 106 compares a predetermined number of continuous integrated values with the threshold value C for detecting a central portion of a MSK modulation mark, the threshold value B for detecting leading and trailing edges of the MSK modulation mark, and the threshold value A for detecting a non-modulated portion before and after the MSK modulation mark, and detects the MSK modulation mark based on the pattern of the comparison results. Therefore, even in the case where a wobble signal is deformed with a cross talk component, address information can be reproduced stably. Consequently, a wobble demodulator capable of obtaining an exact recording position of data can be provided.

Embodiment 2

Figure 6:
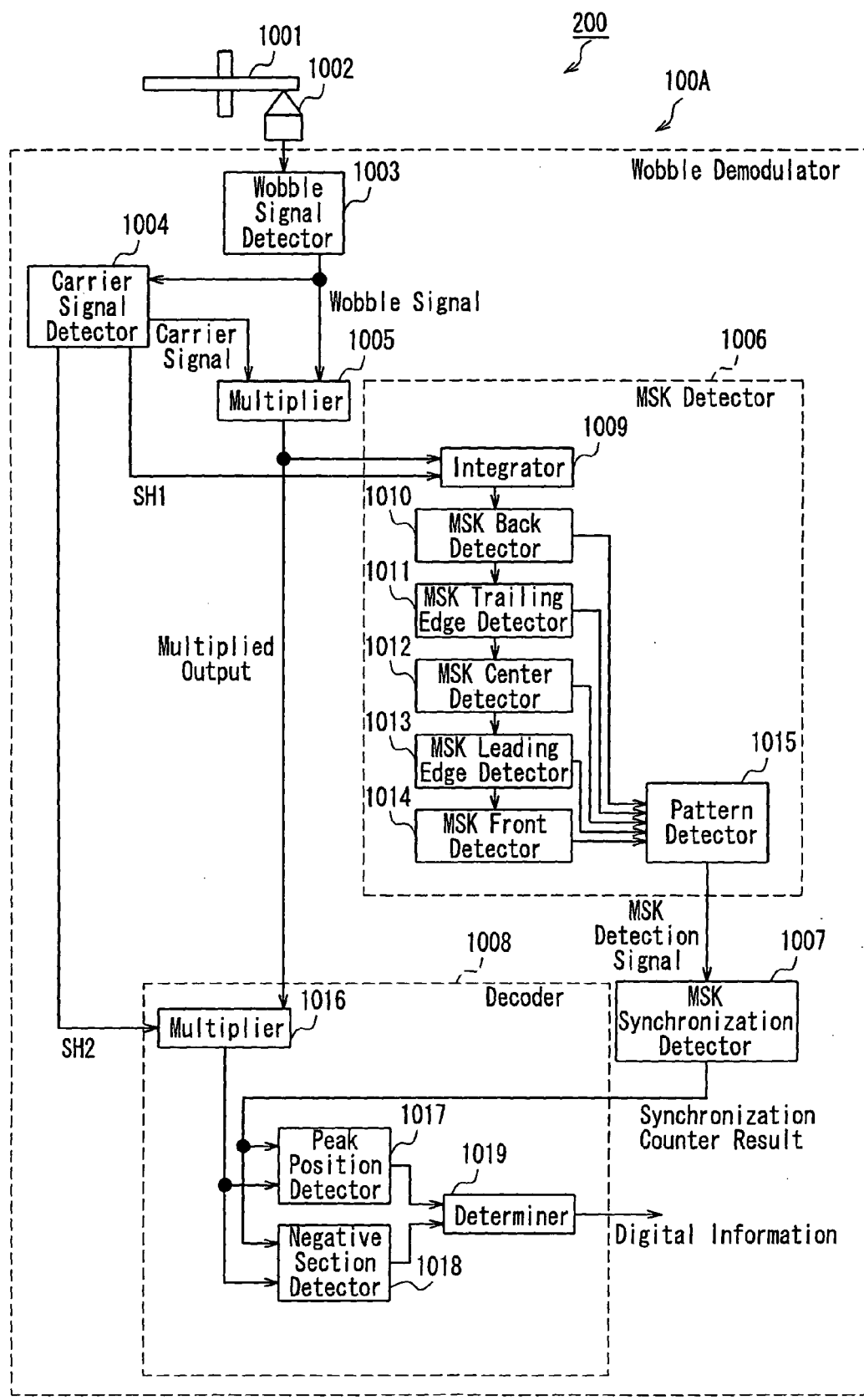
FIG. 6 is a block diagram showing a configuration of a wobble demodulator according to Embodiment 2 of the present invention.

FIG. 6 is a block diagram showing a configuration of a wobble demodulator 100A according to Embodiment 2. In FIG. 6, reference numeral 1001 denotes an optical recording medium on which a MSK-modulated wobble track is formed, and 1002 denotes an optical head for irradiating the optical recording medium 1001 with a light beam and detecting the amount of light reflected from the optical recording medium 1001 to output an electric signal. Reference numeral 1003 denotes a wobble signal detector for detecting the MSK-modulated wobble signal from the electric signal. Reference numeral 1004 denotes a carrier signal generator for generating a carrier signal Cos (ωt) synchronized in phase with the wobble signal. Reference numeral 1005 denotes a multiplier for multiplying the wobble signal by the carrier signal, and 1006 denotes a MSK detector for detecting a MSK modulation mark based on a multiplied output from the multiplier 1005. Reference numeral 1007 denotes a MSK synchronization detector for detecting a bit synchronization position based on the MSK detection signal from the MSK detector 1006. The MSK synchronization detector 1007 detects a bit synchronization MSK modulation mark position placed on the basis of 56 carrier periods to determine a synchronization position, and counts 56 carrier periods, setting the leading edge of a bit block to be 0. Reference numeral 1008 denotes a decoder for decoding digital information based on a multiplied output from the multiplier 1005 in accordance with the synchronization counter result by the MSK synchronization detector 1007.

Next, the detailed operation of the decoder 1008 will be described. The decoder 1008 includes an integrator 1016 for integrating a multiplied output from the multiplier 1005, a peak position detector 1017 for detecting a peak position of an output value from the integrator 1016 in a section in which a MSK modulation mark representing data is placed, a negative section detector 1018 for detecting a section in which an output value from the integrator 1016 is negative in the section in which the MSK modulation mark is placed, and a data determiner 1019 for decoding digital information in accordance with output results from the peak position detector 1017 and the negative section detector 1018.

Figure 7:
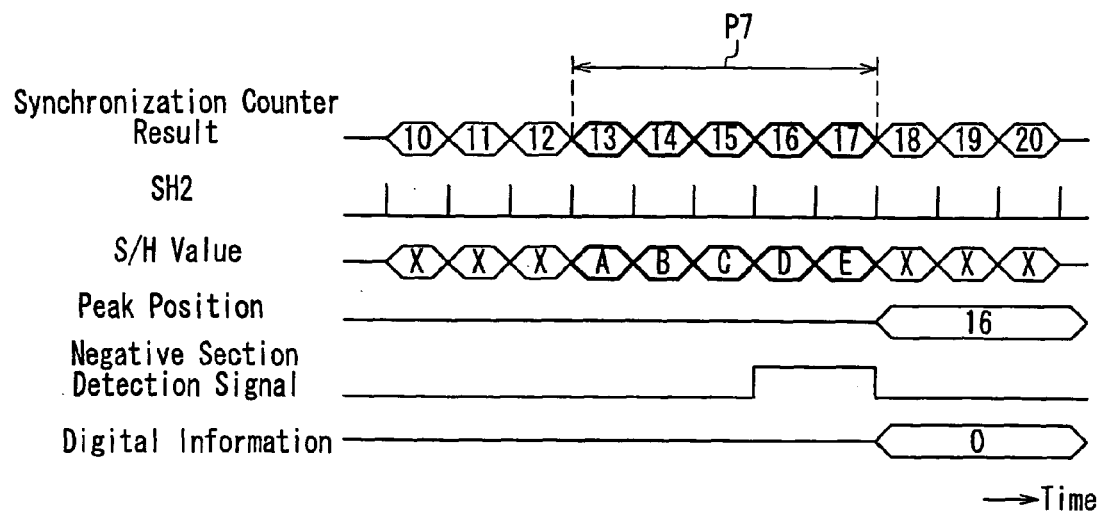
FIG. 7 is a timing waveform diagram showing an operation of a decoder provided in the wobble demodulator according to Embodiment 2 of the present invention.

FIG. 7 is a timing waveform diagram showing an operation of the decoder 1008. The integrator 1016 integrates a multiplied output from the multiplier 1005 in accordance with a sample-and-hold signal SH2 output from the carrier signal generator 1004. The sample-and-hold signal SH2 representing an integration section is a pulse signal that is output when its phase is 0° with respect to a carrier signal Cos (ωt). When the sample-and-hold signal SH2 is not output, the integrator 1016 integrates a multiplied output from the multiplier 1005. When the sample-and-hold signal SH2 is output, the integrator 1016 outputs an integrated value at that time as a S/H value and starts integration from 0.

The peak position detector 1017 detects a position where the S/H value is minimum in a period P7 extending 5 sections in which the value of a synchronization counter is 13 to 17. In the example shown in FIG. 7, a S/H value D at a position where the value of a synchronization counter is 16 is minimum among the S/H values in the period P7 extending 5 sections. Therefore, the peak position detector 1017 outputs 16 as a peak position output.

The negative section detector 1018 detects a section in which a S/H value is negative in the period P7 extending 5 sections in which the value of a synchronization counter is 13 to 17. In the example shown in FIG. 7, since the S/H value is negative when the value of a synchronization counter is 16 and 17, the negative section detector 1018 outputs a negative section detection signal in that section.

The data determiner 1019 decodes data based on the peak position output from the peak position detector 1017 and the negative section detection signal from the negative section detector 1018. When data is "1", a MSK modulation mark is placed in a section in which the value of a synchronization counter is 13 to 15, so that a peak position is detected in that section, and a negative section also is detected in that section. When data is "0", a MSK modulation mark is placed in a section in which the value of a synchronization counter is 15 to 17, so that a peak position is detected in that section, and a negative section also is detected in that section.

From the above, in the case where the peak position output from the peak position detector 1017 is 13 to 14, decoding is performed as data "1", and in the case where the peak position output from the peak position detector 1017 is 16 to 17, decoding is performed as data "0". In the case where the peak position output is 15, if the negative section detection signal output from the negative section detector 1018 is output in a section in which the value of a synchronization counter is 13 to 14, decoding is performed as data "1", and if the negative section detection signal output from the negative section detector 1018 is output in a section in which the value of a synchronization counter is 16 to 17, decoding is performed as data "0". Thus, digital information can be obtained.

In the above-mentioned Embodiment 2, although the pattern determination sections in the MSK detector 1006 are set to be 7 integration sections, the present invention is not limited thereto.

Figure 22:
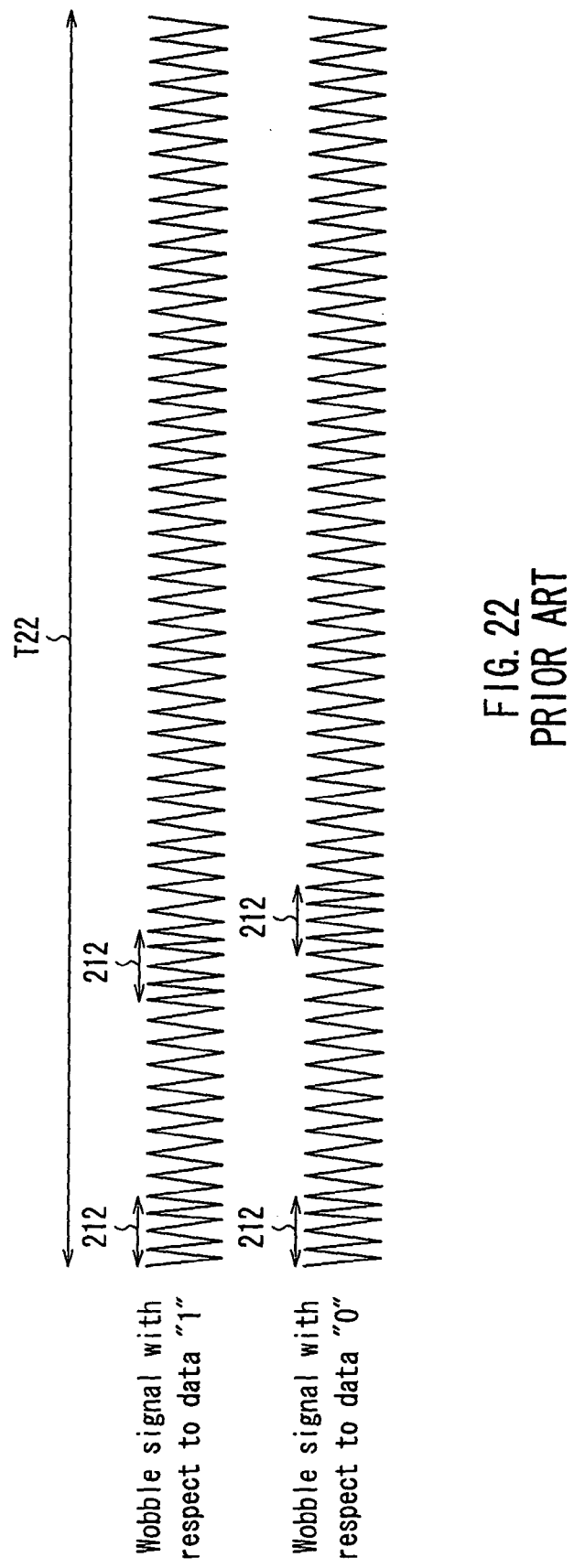
FIG. 22 is a waveform diagram for illustrating a MSK modulation mark.

In the above-mentioned Embodiment 2, the MSK modulation mark extends 3 carrier periods, and the placement position of a MSK modulation mark with respect to 1/0 of digital information is exemplified in the format shown in FIG. 22. However, the present invention is not limited thereto.

As described above, in the wobble demodulators according to Embodiments 1 and 2, a MSK modulation mark is detected based on the leading and trailing edges of the MAK modulation mark and the pattern of three threshold value comparison results in a central portion, whereby the detection position of the MSK modulation mark in the case where a wobble signal is deformed with a cross talk component can be prevented from being shifted. Therefore, exact positional information can be obtained, and address reproduction performance can be enhanced.

Furthermore, by controlling the shift of a MSK modulation mark section corresponding to data "1" and a MSK modulation mark section corresponding to data "0" in accordance with the detection of a shift of the MSK modulation mark, address reproduction performance can be enhanced.

Furthermore, by performing decoding based on the peak position detection and the negative section detection, even when a shift occurs due to a cross talk component, address reproduction performance can be enhanced without being influenced by the shift.

Embodiment 3

Figure 8:
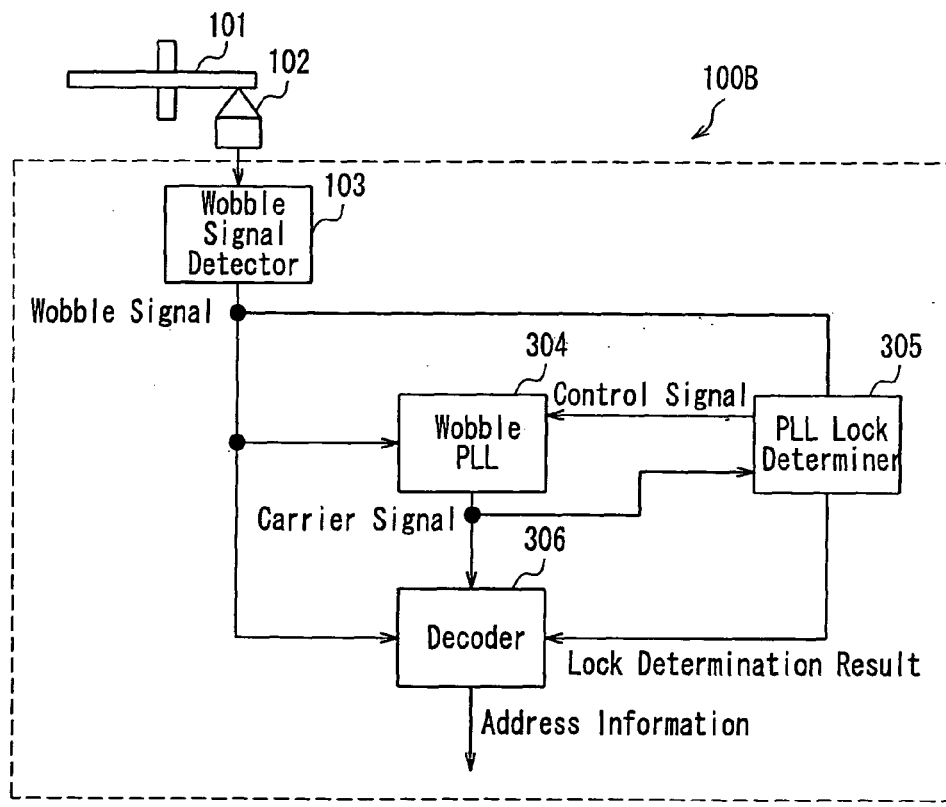
FIG. 8 is a block diagram showing a configuration of a wobble demodulator according to Embodiment 3 of the present invention.

FIG. 8 is a block diagram showing a configuration of a wobble demodulator 100B according to Embodiment 3. In FIG. 8, reference numeral 101 denotes an optical recording medium in which a wobble track is MSK-modulated in accordance with the address formats shown in FIGS. 25 and 26. Reference numeral 102 denotes an optical head for irradiating the optical recording medium 101 with a light beam and detecting the amount of light reflected from the optical recording medium 101 to output an electric signal. Reference numeral 103 denotes a wobble signal detector for detecting the MSK-modulated wobble signal from the electric signal. Reference numeral 304 denotes a wobble PLL for generating a carrier signal synchronized in phase with the wobble signal. Reference numeral 305 denotes a PLL lock determiner for determining a synchronization state of a frequency and a phase between the wobble signal and the carrier signal. Reference numeral 306 denotes a decoder for performing MSK modulation based on the wobble signal and the carrier signal, thereby reproducing address information.

When a light beam radiated from the optical head 102 is condensed to the optical recording medium 101, and a track on the optical recording medium 101 is scanned, whereby a tracking error signal is generated based on light reflected from both sides of the track. The wobble signal detector 103 extracts a wobble signal from the tracking error signal, using a band-pass filter. The wobble PLL 304 multiplies the extracted wobble signal to a wobble dock, thereby generating a wobble clock and a carrier signal obtained by dividing the wobble dock. Furthermore, the PLL lock determiner 305 controls the pull-in operation of the wobble PLL 304 while determining the synchronization state of a frequency and a phase between the wobble signal and the carrier signal. The decoder 306 detects a MSK modulation mark based on the wobble signal and the carrier signal, and reproduces address information in accordance with the position of the MSK modulation mark.

Figure 9:
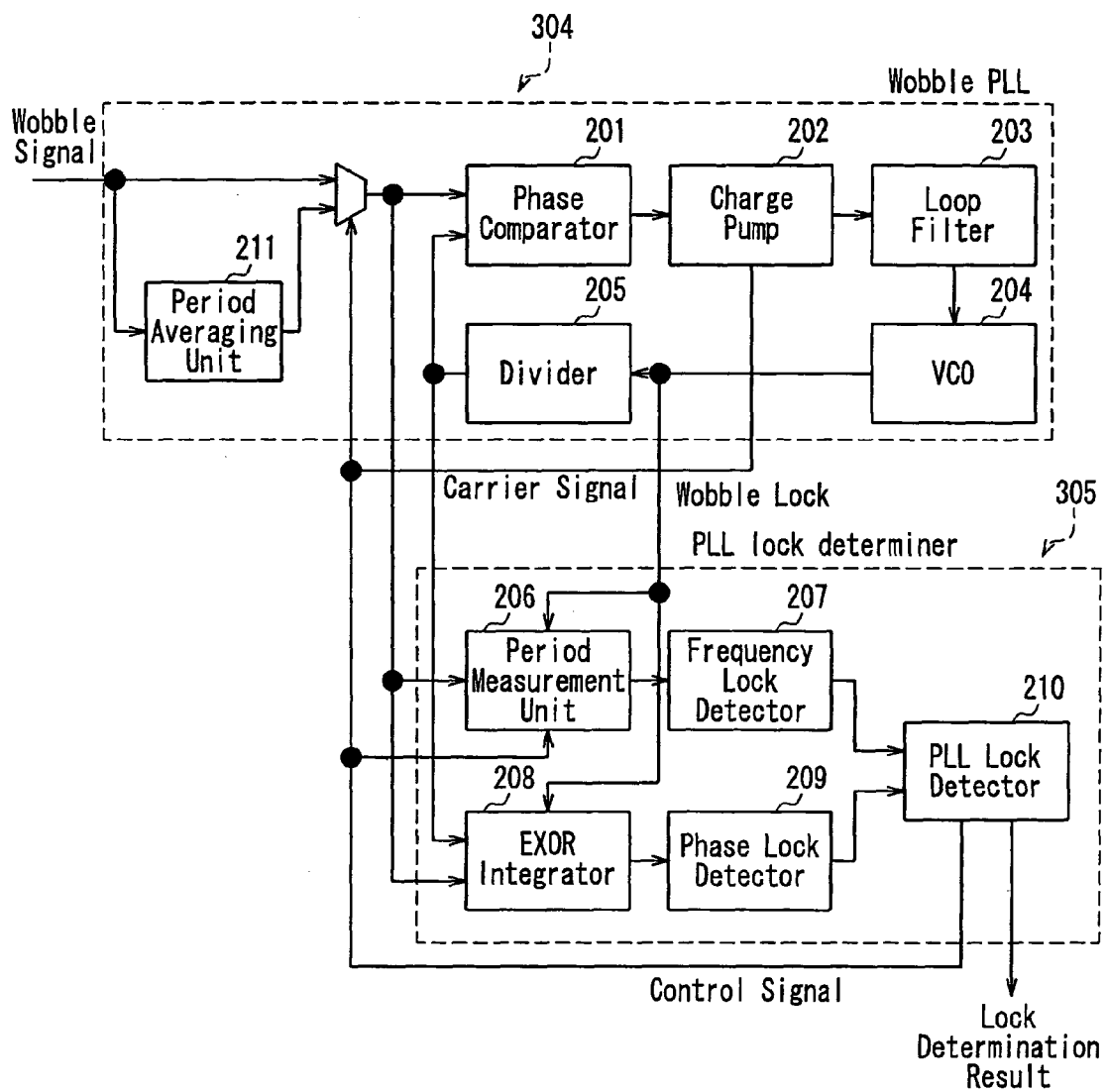
FIG. 9 is a block diagram showing configurations of a wobble PLL and a PLL lock determiner provided in the wobble demodulator according to Embodiment 3 of the present invention.

Next, the detailed operations of the wobble PLL 304 and the PLL lock determiner 305 will be described. FIG. 9 is a block diagram showing configurations of the wobble PLL 304 and the PLL lock determiner 305.

The wobble PLL 304 includes a PLL portion that includes a phase comparator 201 for comparing a phase of a wobble signal with that of a carrier signal, a charge pump 202, a loop filter 203 for smoothening an output from the charge pump 202, a voltage control oscillator (VCO) 204 for generating a wobble dock of a frequency in accordance with a voltage smoothened by the loop filter 203, and a frequency-divider 205 for dividing a wobble dock to generate a carrier signal, and a period averaging unit 211 for averaging a period of the wobble signal.

The PLL lock determiner 305 includes a period measurement unit 206 for measuring a period of the wobble signal, a frequency lock detector 207 for detecting a frequency lock state from a period measurement value, an EXOR integrator 208 for integrating exclusive OR (EXOR) results of binarized signals of the wobble signal and the carrier signal, a phase lock detector 209 for detecting a phase lock state based on the integrated value of the EXOR results, and a PLL lock detector 210 for detecting a PLL lock state based on a frequency lock detection result and a phase lock detection result.

The phase comparator 201 samples division counter values of the frequency-divider 205 for generating a carrier signal, upon detecting a rising edge of a wobble signal, and transmits a phase error pulse in accordance with the sampled value to the charge pump 202. The charge pump 202 discharges or draws in a current in accordance with the received phase error pulse. Because of this operation, the charge pump 202 controls a current for charging the loop filter 203 in a later stage to change the voltage of the loop filter 203, and controls an oscillation frequency of the VCO 204 in a later stage. The dock of the VCO 204 is divided by the divider 205, and is operated as a loop so that the phase error between the carrier signal generated by division and the wobble signal is approximated to zero.

Figure 10A:
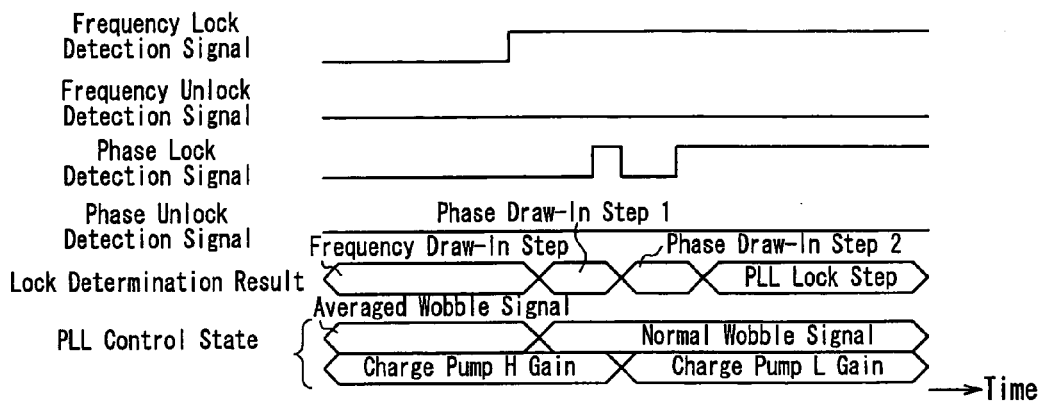
FIGS. 10A to 10C are timing diagrams showing an operation of detecting a PLL lock by the PLL lock determiner provided in the wobble demodulator according to Embodiment 3 of the present invention.
Figure 10B:
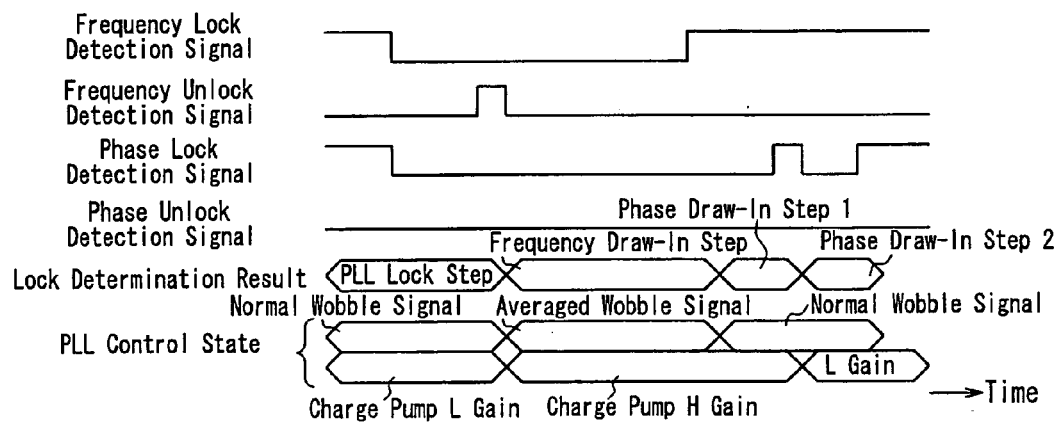
Figure 10C:
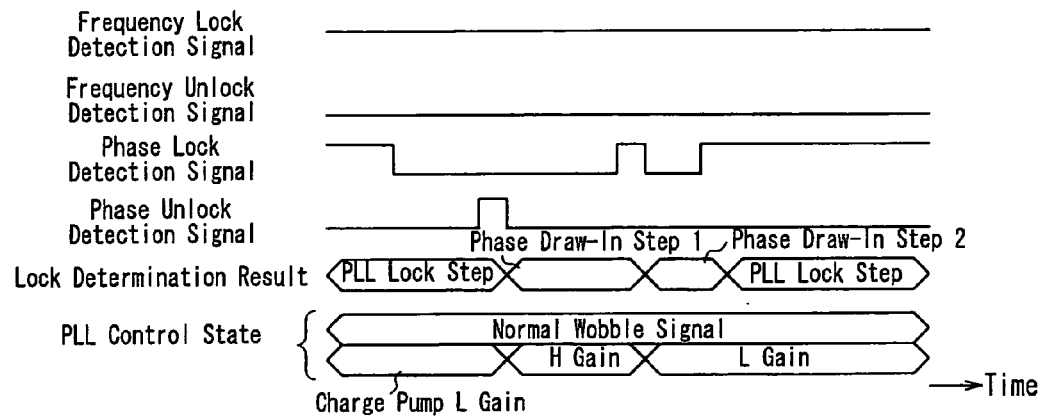

FIGS. 10A to 10C are timing diagrams showing the operation of detecting a PLL lock by the PLL lock detector 210. The PLL lock detector 210 determines a PLL lock state based on the frequency lock detection signal/frequency unlock detection signal detected by the frequency lock detector 207, and the phase lock detection signal/phase unlock detection signal detected by the phase lock detector 209, and outputs a lock determination result. Furthermore, the PLL lock detector 210 outputs a control signal for controlling the wobble PLL 304 in accordance with a lock determination result.

FIG. 10A is a timing diagram showing an operation from the beginning of draw-in of the PLL portion to the determination of a PLL lock. The PLL lock determination result starts from a frequency draw-in step. Then, when a frequency lock detection signal is output, the PLL lock determination result is transitioned to a phase draw-in step 1. If a frequency lock detection signal is output and a phase lock detection signal is output in the phase draw-in step 1, the frequency lock detection result is transitioned to a phase draw-in step 2. If both the frequency lock detection signal and the phase lock detection signal are output again, the frequency lock detection result is transitioned to a PLL lock step.

In accordance with the above-mentioned lock determination results of 4 steps, in order to stabilize a draw-in operation of the wobble PLL 304 and increase a speed thereof, an input switch signal for selecting an input to the phase comparator 201 provided in the wobble PLL 304 and a gain switch signal of the charge pump 202 are output, whereby a draw-in operation is controlled. The gain of the charge pump 202 is set to be High between the frequency draw-in step and the phase draw-in step 1 so as to shorten a draw-in time, and is set to be Low so as to enhance the stability of a wobble clock in the phase draw-in step 2 to the PLL lock step. In the frequency draw-in step, the charge pump 202 is at a High gain, and the frequency of a wobble clock is likely to be fluctuated with respect to a 1.5-fold frequency in a MSK modulation mark portion, so that the input to the phase comparator 201 cannot be converged to a carrier frequency. Therefore, an averaging wobble signal whose period is averaged by the period averaging unit 211 is input. Furthermore, in the phase draw-in step and the subsequent steps, a general wobble signal is input.

Figure 11A:
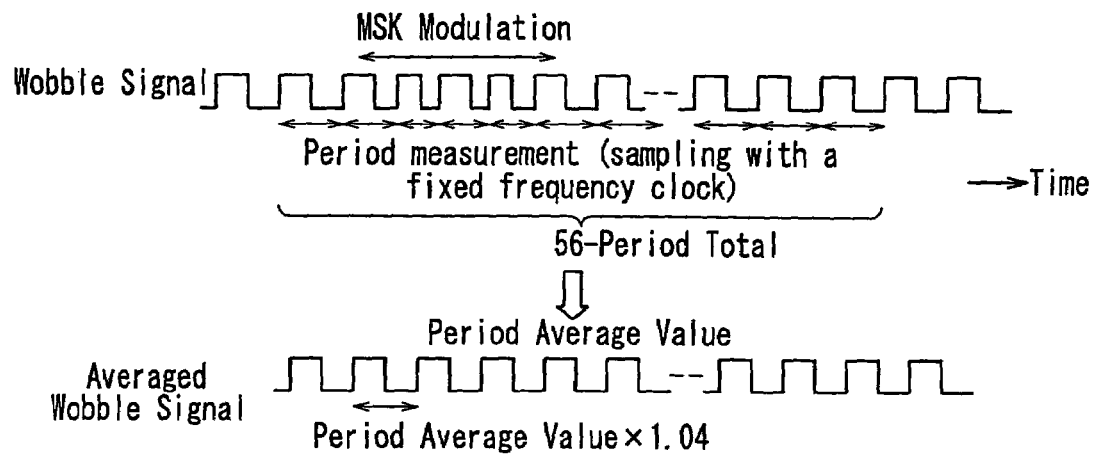
FIG. 11A is a timing diagram showing an operation of a period averaging unit provided in the wobble demodulator according to Embodiment 3 of the present invention.

FIG. 11A is a timing diagram showing the operation of the period averaging unit 211. The period of a wobble signal is measured with a clock of an arbitrary fixed frequency, and a period average value is calculated based on the measurement value in a 56-wobble section. The section for calculating a period average value is set to be 56 or more wobble section so that at least one MSK modulation mark is contained so as to smoothen a change in a period due to MSK modulation. The period averaging unit 211 outputs an averaging wobble signal based on the calculated frequency average value.

Figure 11B:
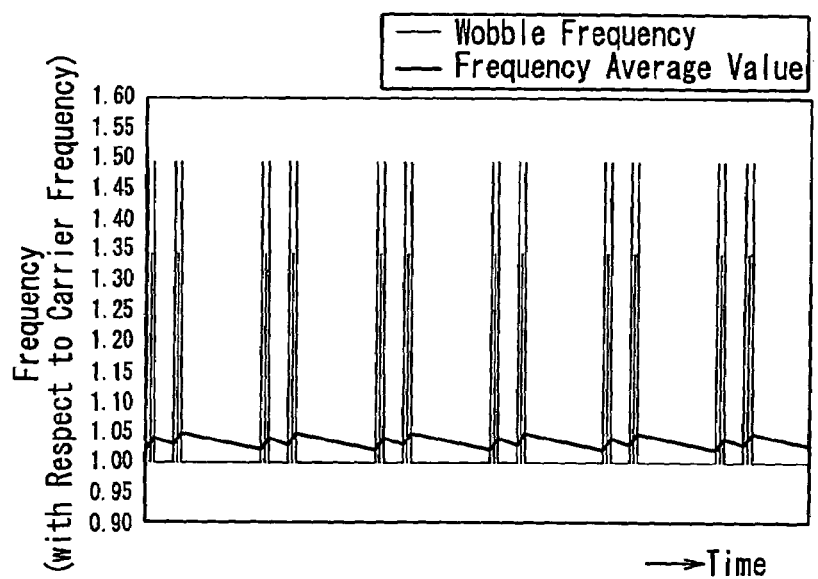
FIG. 11B is a graph showing frequencies of a wobble signal and a change ratio of the average value thereof in the wobble demodulator according to Embodiment 3 of the present invention.

FIG. 11B shows a frequency of a wobble signal and a change ratio of its average value. In a wobble frequency, there are two MSK modulation marks on a 56-wobble basis in the case of a data part, and a 1.5-fold frequency is present. In contrast, assuming that a section for calculating a wobble frequency average value is 56 wobbles, the wobble frequency average value side is locally changed by about 1.5% due to one MSK modulation mark. However, a fluctuation range is within about 3%. Thus, compared with a wobble frequency itself, the wobble frequency average value side is very stable.

However, as is understood from FIG. 11B, the wobble frequency average value has its central frequency increased by about 4% with respect to the carrier frequency. In this state, a frequency cannot be drawn in to an intended carrier frequency exactly in a frequency draw-in step. Therefore, in the subsequent phase draw-in step 1, a phase draw-in range of the PLL portion is not sufficient, causing a cycle slip to prolong a time required for phase draw-in.

In order to eliminate such an offset, an averaged wobble signal is generated based on a value larger by 4% than the calculated period average value is generated, whereby a frequency close to a carrier frequency can be drawn in without being influenced by a MSK modulation in the frequency drawn-in step. Therefore, in the subsequent phase draw-in step 1, a frequency can be drawn in stably in a short period of time without causing a cycle slip.

Next, the determination of a PLL unlock will be described. FIG. 10B is a timing diagram showing an operation when a frequency is unlocked from a PLL lock. FIG. 10C is a timing diagram showing an operation when a phase is unlocked from the PLL lock.

When a frequency unlock detection signal is output, the determination of a PLL lock is transitioned to a frequency draw-in step, and thereafter, a draw-in operation is performed until the same PLL lock step as the above. Furthermore, when a phase unlock detection signal is output, the determination of a PLL lock is transitioned to a phase draw-in step 1, and thereafter, is transitioned to the phase draw-in step 2 and the PLL lock step every time a phase lock detection signal is output, thereby performing a draw-in operation.

Because of this, even when the frequency and the phase of a wobble signal are changed rapidly due to a jump to an adjacent track without any intension, it can be detected immediately that a PLL is not locked. Furthermore, in the case where it is known previously that a PLL is unlocked (seeking), the process proceeds to a frequency draw-in step at a timing of unlocking a PLL, and a draw-in operation is performed from the beginning. Therefore, a stable carrier signal can be generated in a short period of time.

Next, the detailed operations of detecting a frequency lock and a phase lock will be described.

Figure 12A:
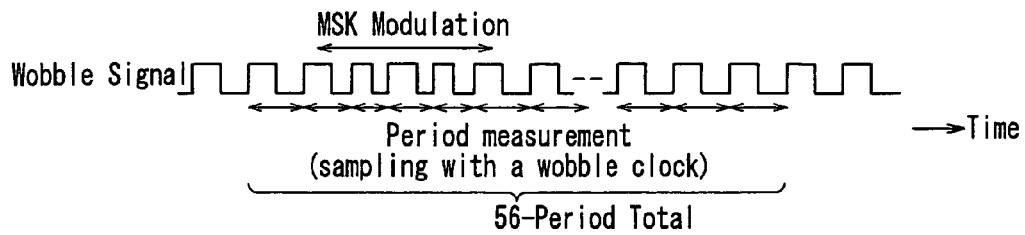
FIG. 12A is a timing diagram showing an operation of detecting a frequency lock by a period measurement unit and a frequency lock detector provided in the PLL lock determiner.

FIG. 12A is a timing diagram showing the operation of detecting a frequency lock by the period measurement unit 206 and the frequency lock detector 207 provided in the PLL lock determiner 305. The period measurement unit 206 outputs a value obtained by measuring one period of a wobble signal with a wobble dock to the frequency lock detector 207. The frequency lock detector 207 obtains a sum of frequency measurement values in 56 wobble sections. If the value is larger than a threshold value FOKmin and smaller than a threshold value FOKmax, the frequencies of the wobble signal and the carrier signal are determined to be locked to output a frequency lock detection signal. Furthermore, when the sum of frequency measurement values is smaller than a threshold value FNGmin or larger than a threshold value FNGmax, the frequency is determined to be unlocked to output a frequency unlock detection signal.

Figure 12B:
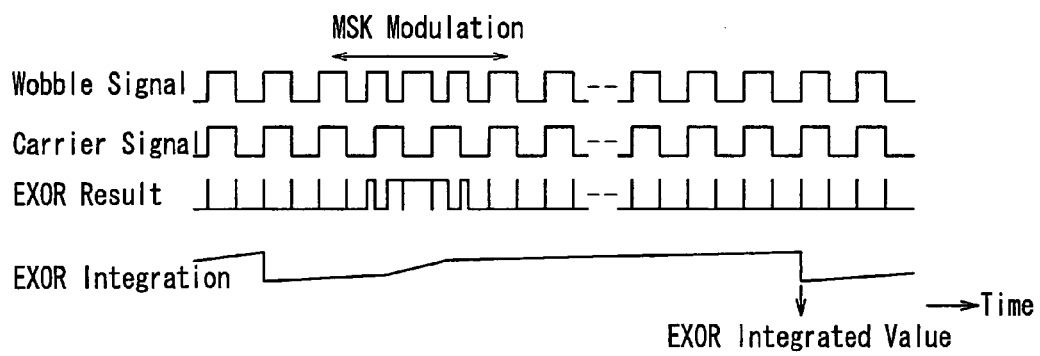
FIG. 12B is a timing diagram showing an operation of detecting a phase lock by an EXOR multiplier and a phase lock detector provided in the wobble demodulator according to Embodiment 3 of the present invention.
Figure 25:
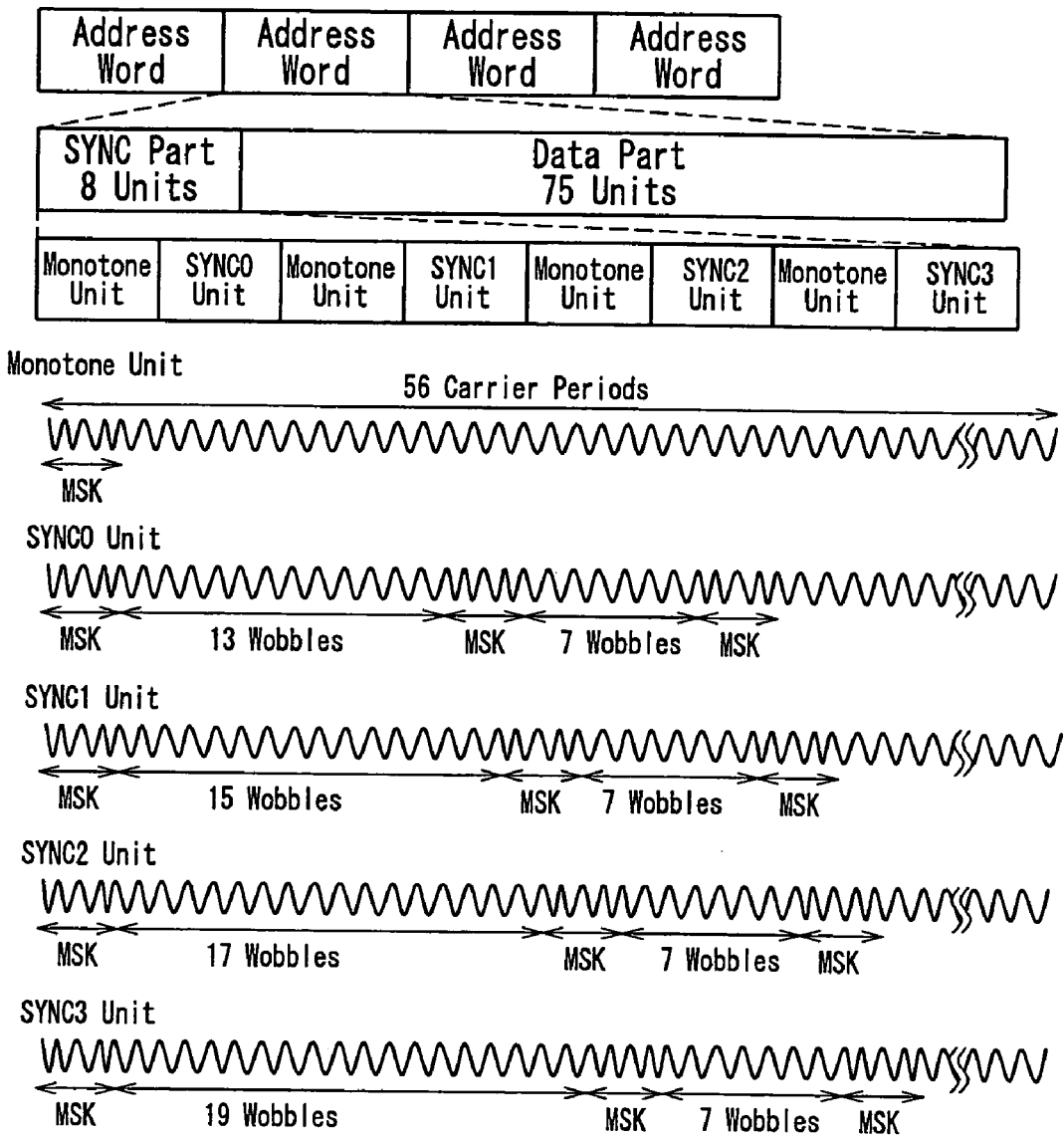
FIG. 25 shows an address format using the MSK modulation.
Figure 26:
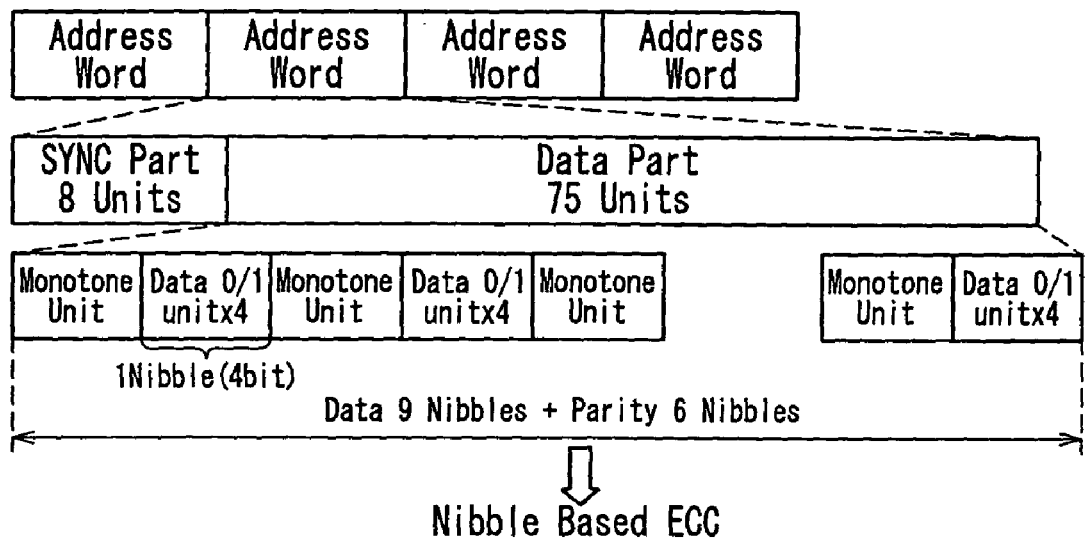
FIG. 26 shows an address format using the MSK modulation.
Figure 26:
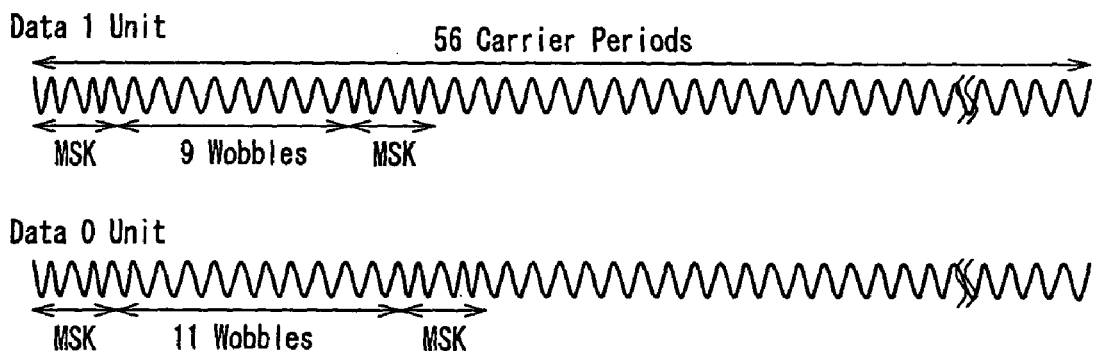
Figure 27:
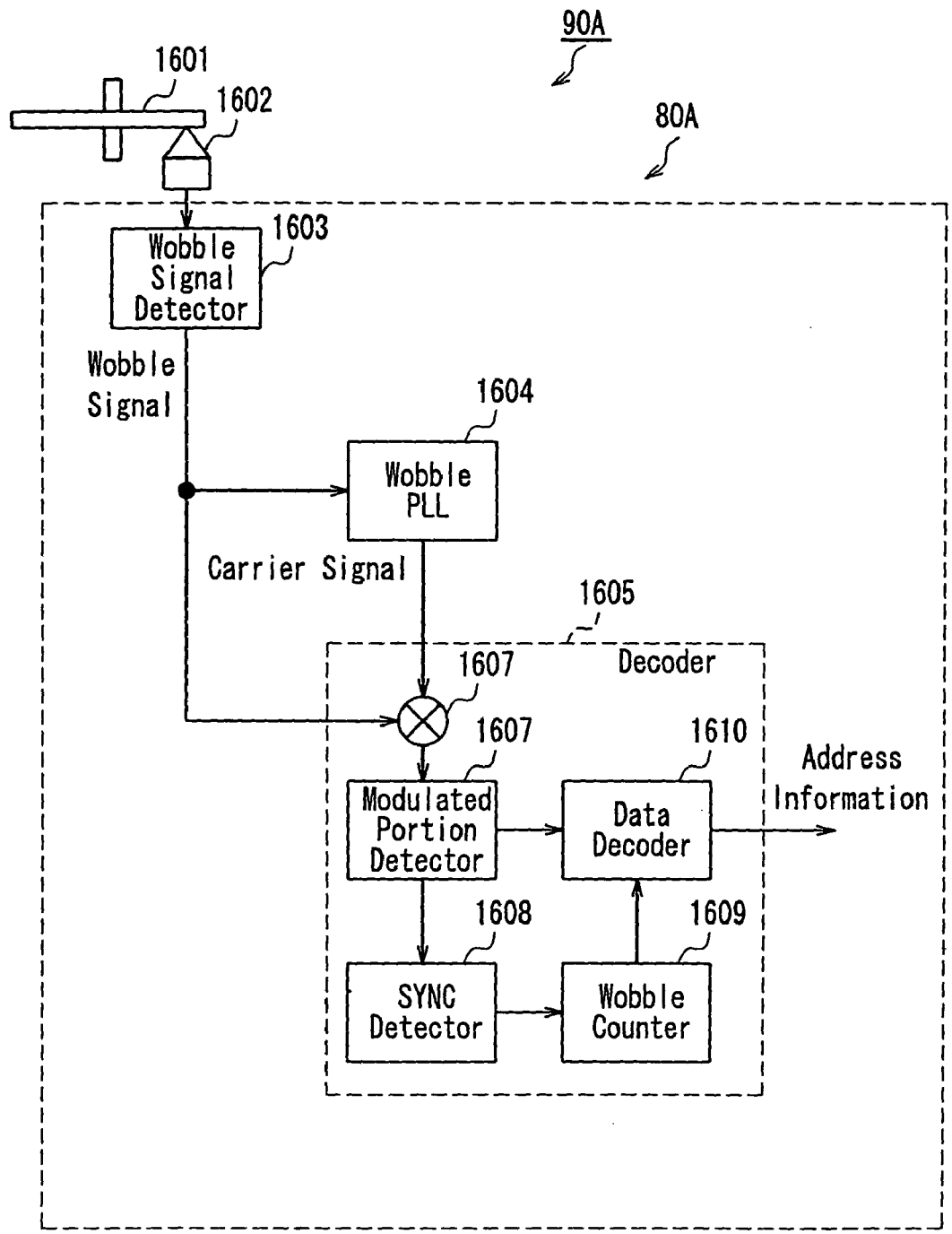
FIG. 27 is a block diagram showing a configuration of another conventional wobble demodulator.
Figure 28A:
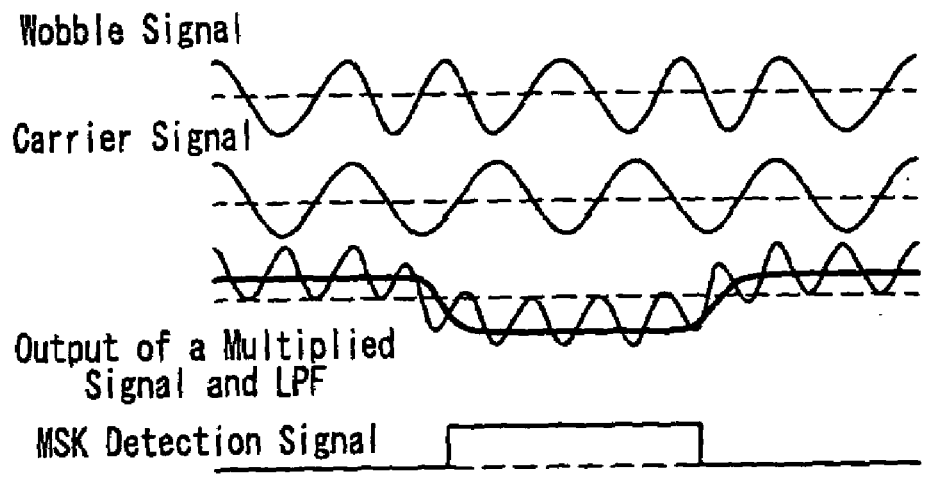
FIGS. 28A and 28B are timing diagrams in the case where a MSK modulation mark is detected by multiplication.
Figure 28B:
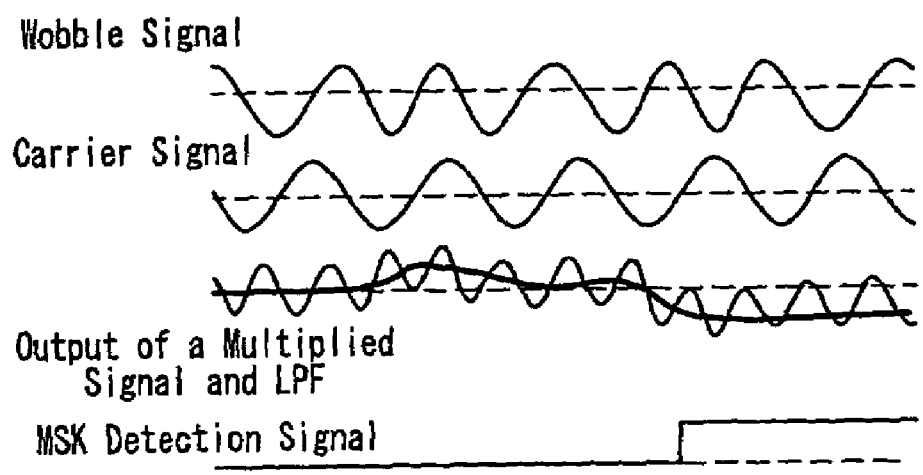

Herein, assuming that all the wobble signals in the 56-wobble section have a carrier frequency in a frequency lock state, the sum of period measurement values is 56 times the carrier period CW (wobble dock is assumed to be obtained by multiplying a carrier period by CW). As shown in FIGS. 25 and 26, there are one to three MSK modulation marks in the 56-wobble section, and the number of waves of a wobble signal is larger by one than the carrier signal on the basis of one MSK modulation mark. Therefore, the 56-wobble section has the same length as that of carrier periods 53 to 55. Thus, each threshold value used for above-mentioned detection of a frequency lock and a frequency unlock is as follows:

$FOKmin=CW \times 53-a,$ $FOKmax=CW \times 55+a,$ $FNGmin=CW \times 52,$ $FNGmax=CW \times 56$ where a is an integer of 0 to less than CW. Furthermore, when the determination of a PLL lock is a frequency draw-in step, and a selected signal is an averaging wobble signal, the influence of the MSK modulation is reduced as described above. Therefore, each threshold value is as follows:

$FOKmin=CW \times 56-a,$ $FOKmax=CW \times 56+a,$ $FNGmin=CW \times 55,$ $FNGmax=CW \times 57$ FIG. 12B is a timing diagram showing the operation of detecting a phase lock by the EXOR integrator 208 and the phase lock detector 209. The EXOR integrator 208 samples exclusive OR of binarized signals of a wobble signal and a carrier signal with a wobble clock, and integrates a sampling result. An integrated value is output as an EXOR integrated value on a carrier period basis, and integration is started again from 0. If the EXOR integrated value is smaller than a threshold value POK, the phase lock detector 209 determines that the phase of the wobble signal and the carrier signal is locked, and outputs a phase lock detection signal. Furthermore, if the EXOR integrated value is larger than a threshold value PNG, the phase is determined to be unlocked, and a phase unlock detection signal is output. As shown in FIGS. 25 and 26, since there are 3 to 4 MSK modulation marks in a 112-carrier period section. Therefore, regarding a value E integrated with respect to one MSK modulation mark, the above threshold values are as follows:

$POK=E \times 4+b,$ $PNG=POK+c$ where b is an integer of 0 to less than E, and c is an integer of 0 or more.

According to the detection of a frequency lock and the detection of a phase lock as described above, the lock state of a PLL can be detected exactly even with respect to a MSK-modulated wobble signal, and a draw-in operation can be controlled.

Figure 13:
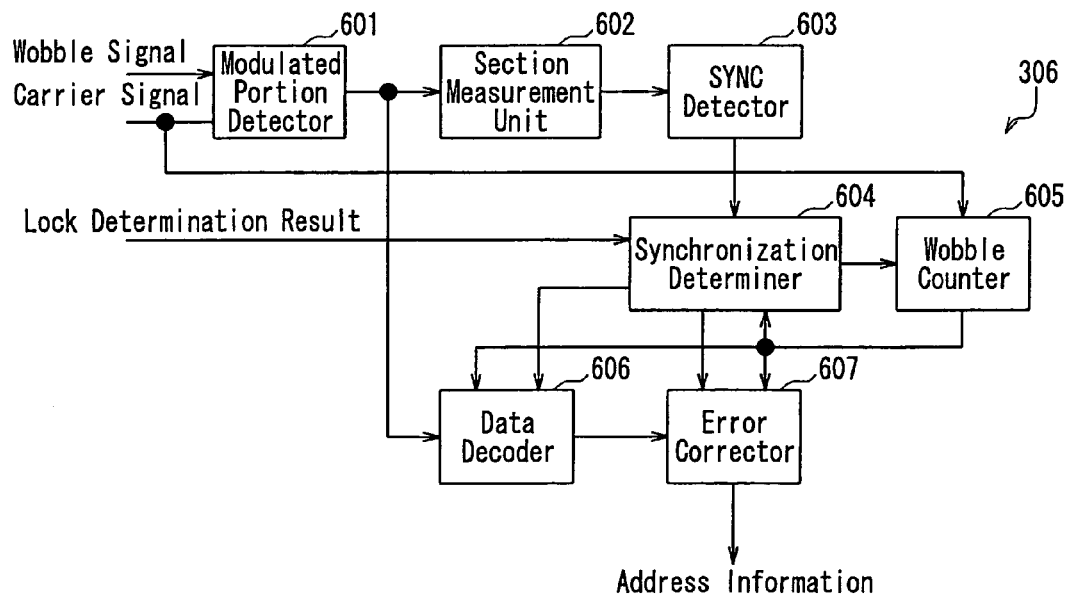
FIG. 13 is a block diagram showing a configuration of a decoder provided in the wobble demodulator according to Embodiment 3 of the present invention.

Next, the detailed operation of the decoder 306 will be described. FIG. 13 is a block diagram showing a configuration of the decoder 306. In FIG. 13, reference numeral 601 denotes a modulated portion detector for detecting a MSK modulation mark. Reference numeral 602 denotes a section measurement unit for measuring an interval of MSK modulation mark detection positions, 603 denotes a SYNC detector for detecting SYNC0 unit/SYNC1 unit/SYNC2 unit/SYNC3 unit based on the measured section length, and 604 denotes a synchronization determiner for determining a synchronization state based on the SYNC detection result. Reference numeral 605 denotes a wobble counter that is operated based on the SYNC detection position. Reference numeral 606 denotes a data decoder for identifying the data1 unit and the data0 unit. Reference numeral 607 denotes an error corrector for correcting an error of data decoded on an address word basis to output address information.

The modulated portion detector 601 multiplies a wobble signal by a carrier signal, detects, as a MSK modulation mark, a position where a value obtained by integrating the multiplied output on a carrier period basis is negative, and outputs a modulated portion detection signal. Alternatively, the modulated portion detector 601 inputs the multiplied output to a low-pass filter, detects, as a MSK modulation mark, a position where an output value from the low-pass filter is negative, and outputs a modulated portion detection signal.

The section measurement unit 602 measures an interval of modulated portion detection signals output from the modulated portion detector 601 on a carrier period basis to output measurement values in the past 3 sections. The SYNC detector 603 determines a position where each SYNC unit is detected based on the value of a MSK modulation mark detection position interval in the past 3 sections by the section measurement unit 602.

As shown in FIG. 25, when the interval of the past three sections is {56, 16, 10}, the modulated portion is determined at the 29th carrier period of the SYNC0 unit. When the interval of the past three sections is {16, 10, 30}, the modulated portion is determined at the 3rd carrier period of the monotone unit subsequent to the SYNC0 unit. When the interval of the past three sections is {10, 30, 56}, the modulated portion is determined at the 3rd carrier period of the SYNC1 unit. When the interval of the past three sections is {56, 18, 10}, the modulated portion is determined at the 31st carrier period of the SYNC1 unit. When the interval of the past three sections is {18, 10, 28}, the modulated portion is determined at the 3rd carrier period of the monotone unit subsequent to the SYNC1 unit. When the interval of the past three sections is {10, 28, 56}, the modulated portion is determined at the 3rd carrier period of the SYNC2 unit. When the interval of the past three sections is {56, 20, 10}, the modulated portion is determined at the 33rd carrier period of the SYNC2 unit. When the interval of the past three sections is {20, 10, 26}, the modulated portion is determined at the 3rd carrier period of the monotone unit subsequent to the SYNC2 unit. When the interval of the past three sections is {10, 26, 56}, the modulated portion is determined at the 3rd carrier period of the SYNC3 unit. When the interval of the past three sections is {56, 22, 10}, the modulated portion is determined at the 35th carrier period of the SYNC3 unit. When the interval of the past three sections is {22, 10, 24}, the modulated portion is determined at the 3rd carrier period of the leading monotone unit of a data part subsequent to the SYNC3 unit. When the interval of the past three sections is {10, 24, 56}, the modulated portion is determined at the 3rd carrier period of the data0 unit or the data1 unit subsequent to the leading monotone unit of the data part. Upon detecting a SYNC pattern, the SYNC detector 603 outputs a SYNCID value representing 0 to 3 of the SYNC unit and detection position information together with a SYNC pattern detection signal.

The synchronization determiner 604 determines a synchronization state based on the lock determination result by the PLL lock determiner 305 shown in FIGS. 8 and 9 and the SYNC detection result by the SYNC detector 603, and pre-sets the wobble counter 605.

Figure 14:
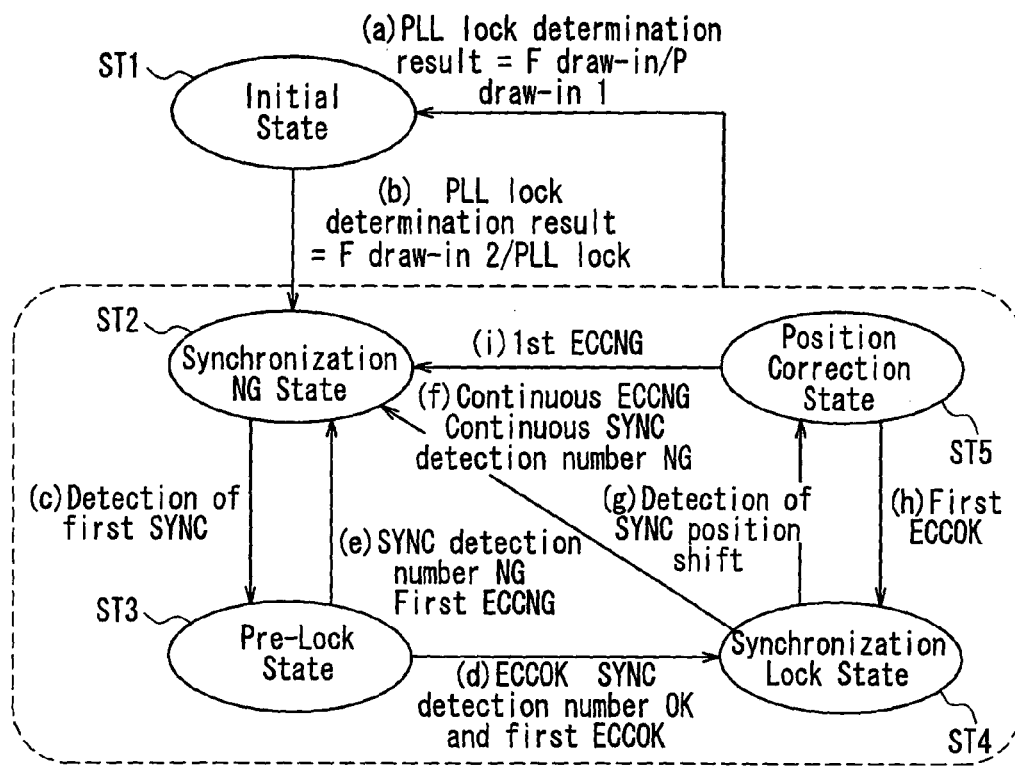
FIG. 14 is a state transition diagram of a synchronization state determination state machine in a synchronization determiner provided in the wobble demodulator according to Embodiment 3 of the present invention.

FIG. 14 is a state transition diagram of a synchronization state determination state machine in the synchronization determiner 604. There are 5 states: "initial state ST1", "synchronization NG state ST2", "pre-lock state ST3", "synchronization lock state ST4", and "position correction state ST5". When the lock determination result by the PLL lock determiner 305 is in the frequency draw-in step or the phase draw-in step 1, an "initial state ST1" is obtained (transition condition (a)). If the operation of detecting a synchronization position is not performed, and the process proceeds to the phase draw-in step 2 or the PLL lock step, the operation of detecting a synchronization position is started from the "synchronization NG state ST2" (transition condition (b)).

In the "synchronization NG state ST2", the wobble counter 605 is pre-set based on the initial SYNC detection result, and the state is transitioned to a "pre-lock state ST3" (transition condition (c)).

In the "pre-lock state ST3", a predetermined number of more of SYNC is detected in the transitioned address word, and a decoding result of the address word can be error-corrected (ECCOK) by the error corrector 607, the state is transitioned to the "synchronization lock state ST4" (transition condition (d)). However, the detection number of SYNC is less then a predetermined number or an error cannot be corrected (ECCNG), the state is transitioned to the "synchronization NG state ST2" (transition condition (e)).

Figure 15:
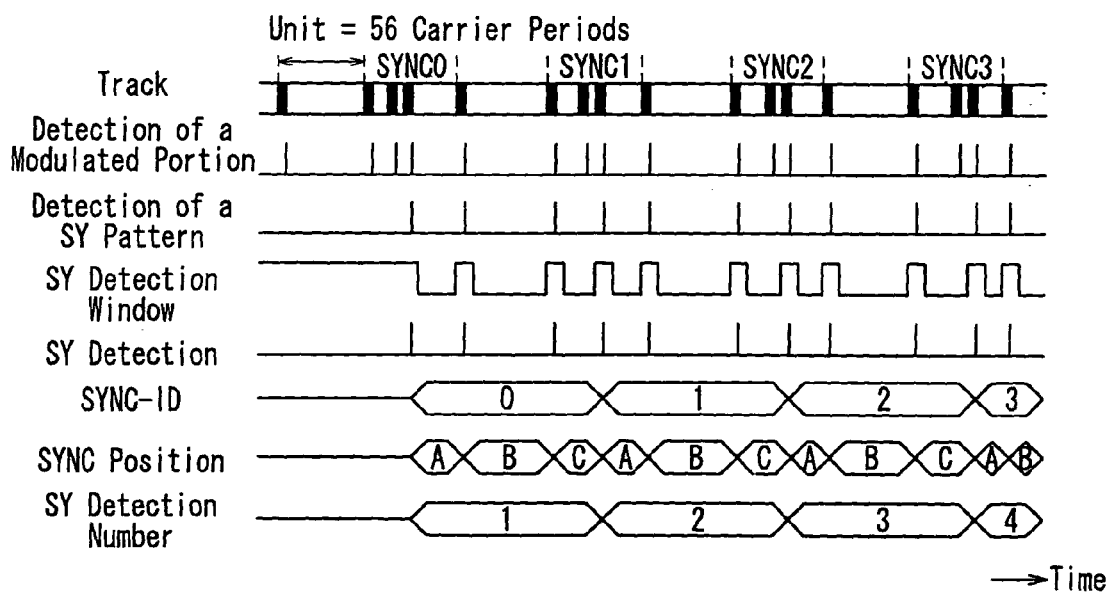
FIG. 15 is a timing diagram showing an operation of determining the detection number of SYNC in the wobble demodulator according to Embodiment 3 of the present invention.

FIG. 15 shows a timing diagram of an operation of determining the detection number of SYNC. The modulated portion detector 601 outputs a modulated portion detection signal in each MSK modulation mark portion. The SYNC detector 603 determines a SYNC pattern based on an output interval of the past three sections of a modulated portion detection signal, and outputs a SY pattern detection signal. The synchronization determiner 604 generates a SY detection window representing a position at which SYNC should be detected based on the state of the state machine and the wobble counter 605.

The SY detection window is full-open (always High) in the "synchronization NG state ST2". When SYNC is detected at first, the wobble counter 605 is pre-set based on the SYNC-ID value and the SYNC position. After the wobble counter 605 is set in a "pre-lock state ST3", a SYNC detection signal is output only at a position where the SYNC is to be detected in accordance with the wobble counter value. Regarding the SYNC detection result, the detection number is counted on the address word basis. When the detection number is equal to or more than a predetermined number, the SYNC detection number is OK. When the detection number is less than a predetermined number, the SYNC detection number is NG.

Figure 16:
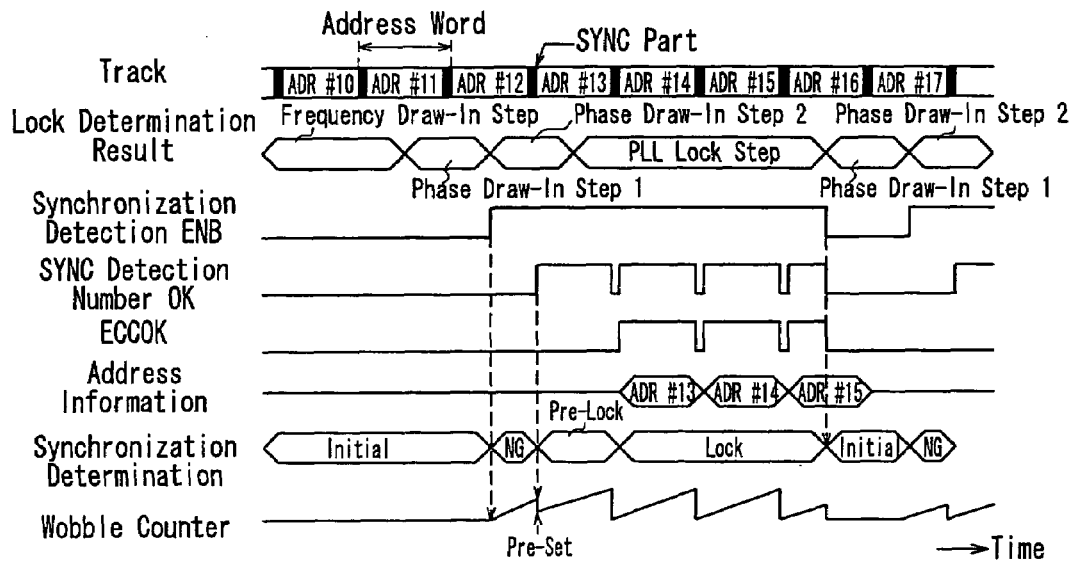
FIG. 16 is a timing diagram showing a transition operation from an "initial state" to a "synchronization lock state" in the wobble demodulator according to Embodiment 3 of the present invention.

FIG. 16 is a timing diagram showing a transition operation from the "initial state ST1" to the "synchronization lock state ST4". When the lock determination result of the wobble PLL is in the frequency draw-in step or in the phase draw-in stet 1, the frequency or the phase is not synchronized between the wobble signal and the carrier signal, resulting in erroneous detection of a synchronization position. Therefore, a synchronization detection ENB signal is not output, and a synchronization position detection operation is not performed in the "initial state ST1". A synchronization detection ENB signal is output in the phase draw-in step 2 or the PLL lock step, and a synchronization position detection is started from the "synchronization NG state ST2".

If the wobble counter is pre-set to the "pre-lock state ST3" in the initial SYNC detection, and the SYNC detection number is OK and ECCOK in the address word, the state is transitioned to the "synchronization lock state ST4". Thereafter, when the lock determination result of the wobble PLL is in the other steps than the phase draw-in step 2 and the PLL lock step, a synchronization ENB signal is not output, and the detection operation of the synchronization position is terminated.

Figure 17:
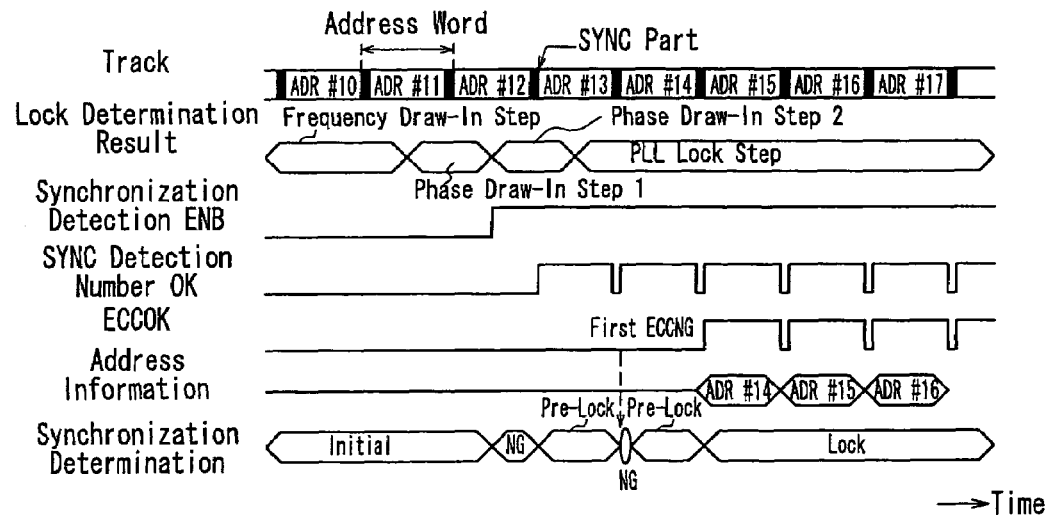
FIG. 17 is a timing diagram showing an operation in the case where a decoding result of an address word transitioned to a "pre-lock state" is ECCNG.

FIG. 17 is a timing diagram showing an operation in the case where a decoding result of the address word transitioned the "pre-lock state ST3" is ECCNG. At the initial SYNC detection, the state is transitioned from the "synchronization NG state ST2" to the "pre-lock state ST3". However, if the decoding result of the transitioned address word is ECCNG, a synchronization position is determined not to be correct. The state returns to the "synchronization NG state ST2" again, and the detection of a synchronization position is performed from the beginning. If the decoding result is ECCOK, the state is transitioned to the "synchronization lock state ST4".

Referring again to FIG. 14, the detection operation of a synchronization unlock from the "synchronization lock state ST4" will be described.

Figure 18:
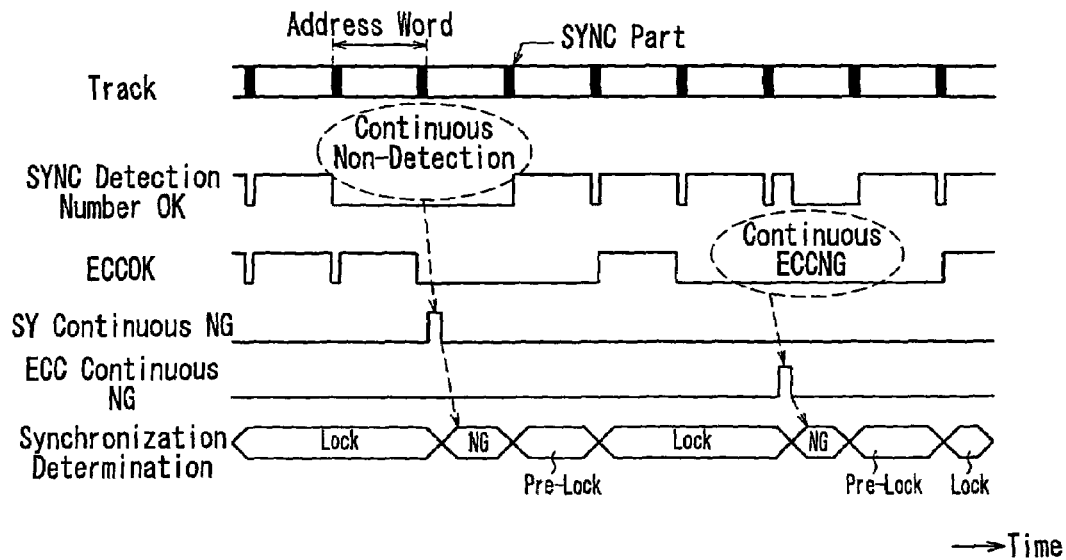
FIG. 18 is a timing diagram showing a transition operation from a "synchronization lock state" to a "synchronization NG state" in the wobble demodulator according to Embodiment 3 of the present invention.

In the "synchronization lock state ST4", if the decoding result is ECCNG continuously, or the SYNC detection number is less than a predetermined number continuously, a synchronization position unlock is determined, and the state is transitioned to the "synchronization NG state ST2" (transition condition (f)). FIG. 18 is a timing diagram showing a transition operation from the "synchronization lock state ST4" to the "synchronization NG state ST2". In the "synchronization lock state ST4", when the SYNC detection number is continuously less than a predetermined number, a SY continuous NG signal is output, and the state is transitioned to the "synchronization NG state ST2". Furthermore, when the decoding result is ECCNG continuously, the ECC continuous NG signal is output, and the state is transitioned to the "synchronization NG state ST2". After transition to the "synchronization NG state ST2", the same operation as the above is performed.

In the "synchronization lock state ST4", in the case where a predetermined number or more of SY pattern detection signals are detected one carrier period before or one carrier period after the SY detection window position, it is determined that the synchronization position is shifted to and fro by one carrier period, and the value of the wobble counter is corrected by +1 or −1, and simultaneously, the state is transitioned to the "position correction state ST5" (transition condition (g)). After transition to the "position correction state ST5", if the decoding result of the address word is ECCOK, the state is transitioned to the "synchronization lock state ST4" (transition condition (h)). If the decoding result is ECCNG, the state is transitioned to the "synchronization NG state ST2" (transition condition (i)).

Figure 19:
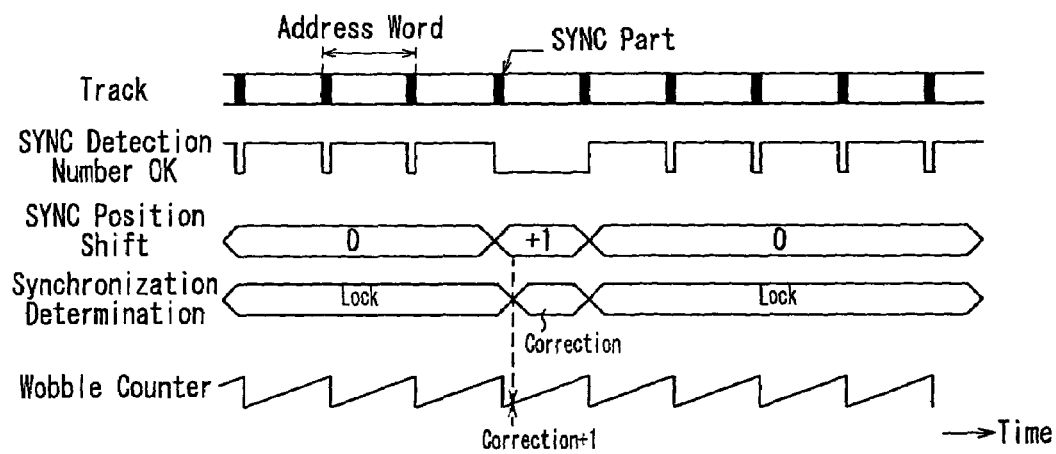
FIG. 19 is a timing diagram showing a transition operation regarding a "position correction state".
Figure 20:
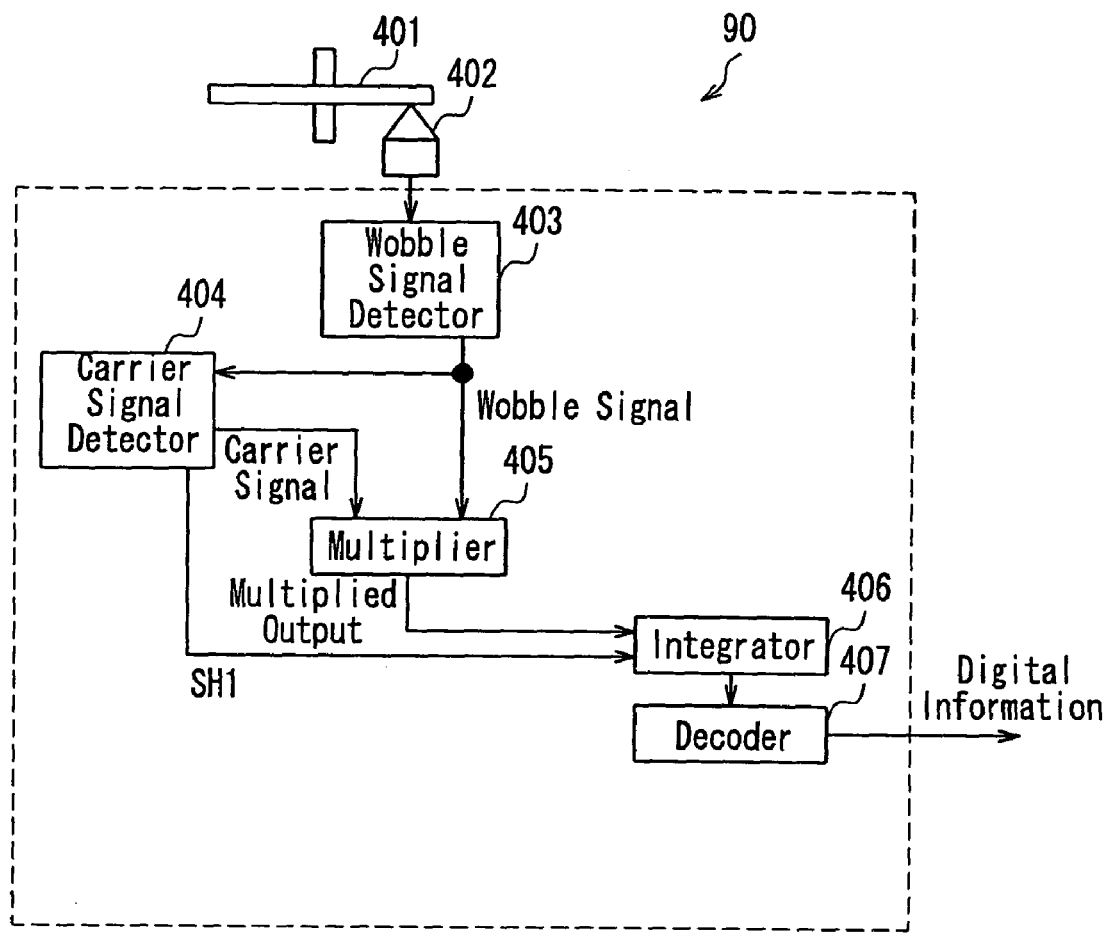
FIG. 20 is a block diagram showing a configuration of a conventional wobble demodulator.
Figure 21:
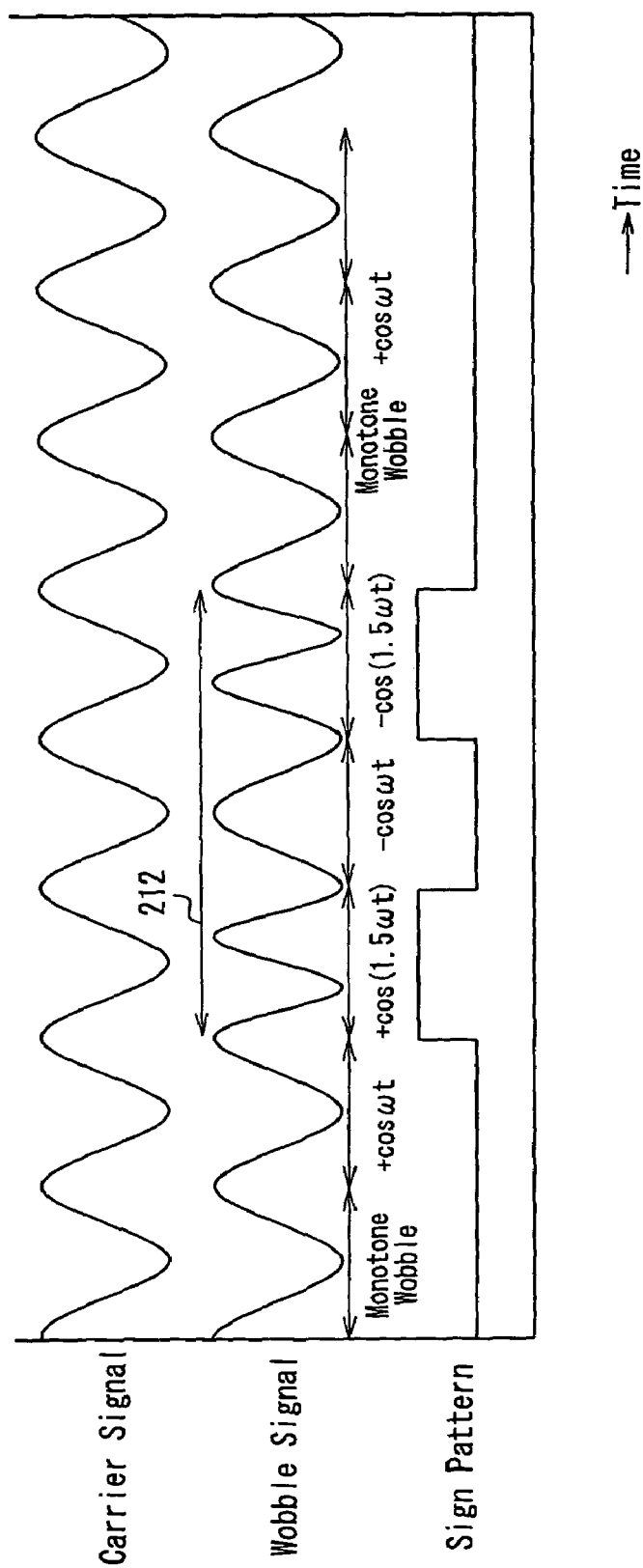
FIG. 21 is a waveform diagram showing a MSK-modulated wobble signal waveform.

FIG. 19 is a timing diagram showing a transition operation regarding the "position correction state ST5". In the "synchronization lock state ST4", a predetermined number or more of SYNC are detected at a position shifted by +1 carrier period in a SYNC part of a certain address word. Therefore, the wobble counter is corrected only by +1 after passage through the SYNC part, and the state is transitioned to the "position correction state ST5". Thereafter, the decoding result of the address word is ECCOK, so that the state is transitioned again to the "synchronization lock state ST4". At this time, if the decoding result is ECCNG, it is determined that a position shift is in a range that cannot be corrected. Then, the state is transitioned to the "synchronization NG state ST2", and a synchronization position is detected again.

Returning again to FIG. 13, the configuration of the decoder will be described. The wobble counter 605 counts one address word based on a carrier signal in a free running manner while being pre-set by the synchronization determiner 604. The counter is composed of a carrier counter for counting 56 carrier periods (=1 unit) and a unit counter for counting 83 units (=1 address word), and the respective counter values are pre-set in accordance with the SYNC-ID value and the SYNC detection position information at an output timing of the SY detection signal. Furthermore, when a SYNC position shift is detected, the value of the carrier counter is corrected by +1 or −1.

The data decoder 606 determines the data1 unit and data0 unit based on the modulated portion detection signal and the value of the wobble counter 605, when the state of the synchronization determiner 604 is in the "pre-lock state ST3", the "synchronization lock state ST4", or the "position correction position ST5", and outputs a data determination result with respect to the error corrector 607. When the unit counter value of the wobble counter 605 is (9+i×5), (10+i×5), (11+i×5), or (12+i×5), data determination is performed in accordance with an output position of the modulated portion detection signal with respect to the carrier counter value. The data determination result is converted to a 4-bit (Nibble) parallel value every time the unit counter value is (8+i×5) or 0, and outputted to the error corrector 607. Furthermore, after the data determination result is output when the unit counter value is 0, a correction starting signal for correcting an error also is output to the error corrector 607.

The error corrector 607 accumulates data determination results (15 Nibbles) of one address word from the data decoder 606. When a correction start signal is output, the error corrector 607 performs error correction processing using the first half 9 Nibbles as data and using the latter half 6 Nibbles as a parity. As a result, the error corrector 607 outputs address information and an ECCOK signal representing whether an error can be corrected or not.

As described above, the draw-in operation of a wobble PLL with respect to a MSK-modulated wobble signal and a decoding operation of address information recorded by MSK modulation are controlled in accordance with a determination result of the lock state of a wobble PLL, whereby address information can be reproduced stably in a short period of time, even in the case where the frequency and phase of a wobble signal are changed due to seeking and jumping to an adjacent track.

In the above-mentioned embodiment, an example with respect to a MSK-modulated wobble track has been described. However, the present invention is not limited thereto. Even with PSK modulation and other FSK modulations may exhibit similar effects. Furthermore, the format in which digital information such as an address is recorded is set as shown in FIGS. 25 and 26. However, the present invention is not limited thereto.

In the PLL lock determiner 305 in the above-mentioned embodiments, a sum of measured periods is used for detecting a frequency lock. However, the present invention is not limited thereto, and average value may be used.

In the decoder 306 in the above-mentioned embodiments, as a method for detecting a modulated portion, a multiplied output of a wobble signal and a carrier signal is detected from the result passed through integration or a low-pass filter. However, the present invention is not limited thereto. Similar effects can be exhibited as long as a wobble signal and a carrier signal are used.

Furthermore, regarding the detection of a SYNC positional shift in the synchronization determiner 604 of the decoder 306, if the SYNC detection position in one address word is shifted to and fro by one carrier period, correction is made. However, if the SYNC detection position is shifted continuously by a predetermined amount over a plurality of address words, a wobble counter value may be corrected.

Furthermore, according to the method for decoding data by the decoder 306, decoding is performed from a modulated portion detection signal output position with respect to a wobble counter value. However, the present invention is not limited thereto.

As described above, in the wobble demodulator according to Embodiment 3, the lock state of a wobble PLL is determined, and a synchronization position of digital information recorded by FSK modulation or PSK modulation is detected in accordance with the determination result, whereby address information can be reproduced stably.

Furthermore, in a section containing modulation marks evenly, a frequency lock is detected based on the value obtained by measuring a wobble signal from a wobble lock and a phase lock is detected based on an exclusive OR between a wobble signal and a carrier signal, whereby the lock state of a wobble PLL can be determined exactly even with respect to a FSK-modulated or PSK-modulated wobble signal.

Furthermore, when the frequency of a wobble PLL is drawn in, an averaged wobble signal obtained by averaging a period of a wobble signal is input to a wobble PLL, whereby a frequency can be drawn in stably at a high speed without being influenced by a frequency change due to FSK modulation and PSK modulation.

Furthermore, by determining a synchronization position based on a result obtained by error-correcting the detection number of SYNC representing a synchronization position of digital information and a decoding result, a synchronization position of digital information can be detected exactly and stably.

Furthermore, by detecting that a SYNC detection position is shifted by a predetermined amount to correct a synchronization position, digital information can be reproduced stably.

Furthermore, digital information can be reproduced stably by detecting that a SYNC detection position is shifted by a predetermined amount and correcting a synchronization position.

Furthermore, even if unexpected track jumping occurs, erroneous recording in an adjacent track can be minimized by reproducing exact address information immediately.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A wobble demodulator for reproducing digital information from an optical recording medium in which a track is formed in accordance with a wobble signal that is MSK-modulated so as to contain the digital information by a carrier signal with a predetermined frequency and a sine wave signal with a frequency different from that of the carrier signal, comprising:
   a wobble signal detector for detecting a wobble signal of the track from the optical recording medium;
   a carrier signal detector for detecting the carrier signal based on the wobble signal detected by the wobble signal detector;
   a multiplier for multiplying the carrier signal detected by the carrier signal detector by the wobble signal detected by the wobble signal detector and outputting a multiplied output;
   a MSK detector for detecting a MSK modulation mark having a phase or a frequency different from that of the carrier signal, based on an integrated value obtained by integrating the multiplied output from the multiplier on a predetermined section basis; and
   a MSK synchronization detector for detecting a synchronization position with respect to the digital information, based on the MSK modulation mark detected by the MSK detector,
   wherein the MSK detector compares a continuous predetermined number of absolute values of the integrated values with a first threshold value for detecting a central portion of the MSK modulation mark, a second threshold value for detecting leading and trailing edges of the MSK modulation mark, and a third threshold value for detecting non-modulated portions before and after the MSK modulation mark, and detects the MSK modulation mark based on a pattern of a comparison result.

2. The wobble demodulator according to claim 1, wherein the continuous predetermined number of the integrated values are calculated by integrating only a negative value of the multiplied output from the multiplier on a half-period basis of the carrier signal.

3. The wobble demodulator according to claim 1, further comprising a decoder for decoding the digital information based on the synchronization position detected by the MSK synchronization detector and the multiplied output from the multiplier.

4. The wobble demodulator according to claim 1, wherein the first threshold value is higher than the second threshold value, and the second threshold value is higher than the third threshold value.

5. The wobble demodulator according to claim 1, further comprising a decoder for decoding the digital information based on the synchronization position detected by the MSK synchronization detector and the integrated value obtained by integrating the multiplied output from the multiplier on a predetermined section basis.

6. The wobble demodulator according to claim 5, wherein the decoder decodes the digital information based on a position at which the integrated value is minimum.

7. The wobble demodulator according to claim 1, wherein the MSK modulation mark is inserted in a predetermined position of the wobble signal.

8. The wobble demodulator according to claim 5, wherein the decoder decodes the digital information based on a sign of a difference value between a first sum obtained by summing integrated values in a MSK modulation mark section corresponding to data "1" of the digital information and a second sum obtained by summing integrated values in a MSK modulation mark section corresponding to data "0".

9. The wobble demodulator according to claim 8, wherein MSK modulation marks are disposed in the track at a predetermined interval as bit synchronization marks of the digital information, and
   the decoder detects a bias of an integrated value in a bit synchronization mark section, and shifts a section in which the first sum is obtained or a section in which the second sum is obtained in accordance with a detection result.

10. The wobble demodulator according to claim 9, wherein the decoder detects a bias of the integrated value based on a sign of the integrated value in the bit synchronization mark section and a comparison result between an integrated value in a central portion of the bit synchronization mark and an integrated value in leading and trailing edges of the bit synchronization mark.

11. An optical disk apparatus comprising:
   an optical head for irradiating an optical recording medium with a light beam and converting the light beam reflected from the optical recording medium to an electric signal; and
   the wobble demodulator of claim 1 for reproducing digital information based on the electric signal converted by the optical head.

12. A wobble demodulation method for reproducing digital information from an optical recording medium in which a track is formed in accordance with a wobble signal that is MSK-modulated so as to contain the digital information by a carrier signal with a predetermined frequency and a sine wave signal with a frequency different from that of the carrier signal, comprising:

detecting a wobble signal of the track from the optical recording medium;

detecting the carrier signal based on the wobble signal detected by the detection of the wobble signal;

multiplying the carrier signal detected by the detection of the carrier signal by the wobble signal detected by the detection of the wobble signal and outputting a multiplied output;

detecting a MSK modulation mark having a phase or a frequency different from that of the carrier signal, based on an integrated value obtained by integrating the multiplied output in the multiplication on a predetermined section basis; and detecting a synchronization position with respect to the digital information, based on the MSK modulation mark detected in the detection of the MSK, wherein in the detection of the synchronization position, a continuous predetermined number of absolute values of the integrated values are compared with a first threshold value for detecting a central portion of the MSK modulation mark, a second threshold value for detecting leading and trailing edges of the MSK modulation mark, and a third threshold value for detecting non-modulated portions before and after the MSK modulation mark, and detects the MSK modulation mark based on a pattern of a comparison result.

13. The wobble demodulation method according to claim 12, wherein the continuous predetermined number of the integrated values are calculated by integrating only a negative value of the multiplied output in the multiplication on a half-period basis of the carrier signal.

14. The wobble demodulation method according to claim 12, further comprising decoding the digital information based on the synchronization position detected in the detection of the MSK synchronization and the multiplied output in the multiplication.

15. The wobble demodulation method according to claim 12, wherein the first threshold value is higher than the second threshold value, and the second threshold value is higher than the third threshold value.

16. The wobble demodulation method according to claim 12, further comprising decoding the digital information based on the synchronization position detected by the detection of the MSK synchronization and the integrated value obtained by integrating the multiplied output in the multiplication on a predetermined section basis.

17. The wobble demodulation method according to claim 16, wherein in the decoding, the digital information is decoded based on a position at which the integrated value is minimum.

18. The wobble demodulation method according to claim 12, wherein the MSK modulation mark is inserted in a predetermined position of the wobble signal.

19. The wobble demodulation method according to claim 16, wherein in the decoding, the digital information is decoded based on a sign of a difference value between a first sum obtained by summing integrated values in a MSK modulation mark section corresponding to data "1" of the digital information and a second sum obtained by summing integrated values in a MSK modulation mark section corresponding to data "0".

20. The wobble demodulation method according to claim 19, wherein MSK modulation marks are disposed in the track at a predetermined interval as bit synchronization marks of the digital information, and in the decoding, a bias of an integrated value in a bit synchronization mark section is detected, and a section in which the first sum is obtained or a section in which the second sum is obtained is shifted in accordance with a detection result.

21. The wobble demodulation method according to claim 20, wherein in the decoding, a bias of the integrated value is detected based on a sign of the integrated value in the bit synchronization mark section and a comparison result between an integrated value in a central portion of the bit synchronization mark and an integrated value in leading and trailing edges of the bit synchronization mark.

* * * * *